(12) United States Patent
Ra et al.

(10) Patent No.: US 10,554,421 B2
(45) Date of Patent: Feb. 4, 2020

(54) METHOD FOR SUPERSEDING LOG-IN OF USER THROUGH PKI-BASED AUTHENTICATION BY USING SMART CONTACT AND BLOCKCHAIN DATABASE, AND SERVER EMPLOYING SAME

(71) Applicant: Coinplug, Inc., Gyeonggi-do (KR)

(72) Inventors: Seung Il Ra, Seoul (KR); Hee Soon Kim, Gyeonggi-do (KR); Jay Wu Hong, Seoul (KR); Joon Sun Uhr, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 0 days.

(21) Appl. No.: 16/540,834

(22) Filed: Aug. 14, 2019

(65) Prior Publication Data
US 2019/0372786 A1    Dec. 5, 2019

Related U.S. Application Data

(63) Continuation of application No. PCT/KR2018/000914, filed on Jan. 19, 2018.

(30) Foreign Application Priority Data

Feb. 14, 2017   (KR) ........................ 10-2017-0019772

(51) Int. Cl.
*G06F 21/00*   (2013.01)
*H04L 9/32*   (2006.01)
(Continued)

(52) U.S. Cl.
CPC ............ *H04L 9/3268* (2013.01); *H04L 9/006* (2013.01); *H04L 9/0637* (2013.01);
(Continued)

(58) Field of Classification Search
CPC ..... H04L 9/3268; H04L 9/006; H04L 9/0637; H04L 9/3213; H04L 9/3234; H04L 2209/38
See application file for complete search history.

(56) References Cited

U.S. PATENT DOCUMENTS 10,225,245 B2 *   3/2019   Pace .................... H04L 63/0815
10,373,158 B1 *   8/2019   James ................ G06Q 20/3829

FOREIGN PATENT DOCUMENTS

KR    10-2006-0123470 A    12/2006
KR       10-1085631 B1    11/2011
(Continued)

OTHER PUBLICATIONS

International Search Report issued in PCT application No. PCT/KR2018/000914, dated May 14, 2018, 6 pp.

*Primary Examiner* — Brian F Shaw
(74) *Attorney, Agent, or Firm* — Kaplan Breyer Schwarz, LLP

(57) ABSTRACT

Once information requesting superseding of a log-in through an authentication app is obtained from a service provision app on a user terminal, a service provision server transfers authentication request response information to the service provision app and, after an authentication redirection request thereof is transferred to the authentication app and then server challenge request information is obtained, server challenge request response information is transferred to the authentication app, thereby supporting the determination as to whether or not certificates of the server and the app are valid, an authentication result message including information on the validity is obtained from an authentication server, a predetermined access token is transferred to the service provision app, and thereby the log-in is handled by providing support such that a service can be used.

19 Claims, 7 Drawing Sheets

(51) Int. Cl.
*H04L 9/00* (2006.01)
*H04L 9/06* (2006.01)

(52) U.S. Cl.
CPC .......... *H04L 9/3213* (2013.01); *H04L 9/3234* (2013.01); *H04L 2209/38* (2013.01)

(56) References Cited

FOREIGN PATENT DOCUMENTS

| | | | |
|---|---|---|---|
| KR | 2014-0110540 | A | 9/2014 |
| KR | 10-1628004 | B1 | 6/2016 |
| KR | 10-1661933 | B1 | 10/2016 |

\* cited by examiner

FIG. 6

```
contract useCounter{
  int counter;
  function useCounter(int initNumber){
    counter = initNumber;
  }
  function decrease() constant returns (int){
    counter -= 1;
    return counter;
  }
}
```

FIG. 7

```
contract useCounter{
  int counter;
  function useCounter(){
    counter = 10;
  }
  function decrease() constant returns (int){
    counter -= 1;
    return counter;
  }
}
```

METHOD FOR SUPERSEDING LOG-IN OF USER THROUGH PKI-BASED AUTHENTICATION BY USING SMART CONTACT AND BLOCKCHAIN DATABASE, AND SERVER EMPLOYING SAME

RELATED APPLICATIONS

This application is a bypass continuation application of International application No. PCT/KR2018/000914 filed Jan. 19, 2018, which in turn claims foreign priority to Korean application No. 10-2017-0019772 filed Feb. 14, 2017, the entire disclosures of which are incorporated herein by reference.

FIELD OF THE DISCLOSURE

The present disclosure relates to a method for delegating a login via authentication based on a PKI (public key infrastructure) by utilizing a blockchain database and a smart contract in response to a login request from a user for using a service provided by a service-providing server, and the service-providing server and an authentication server using the same.

BACKGROUND OF THE DISCLOSURE

As a conventional service for delegating a login of a user, OAuth 2.0 is a standard authentication method for web, mobile, and desktop applications, and adopts an open protocol that can perform secure authentication. Prior to use of the OAuth, there was no authentication standard, so a basic form of authentication, i.e., a combination of an ID and a password, has been used, but this is a weak form of the authentication. In case of a non-basic form of the authentication, each application verifies the user using its own protocol, such as Google's AuthSub, AOL's OpenAuth, Yahoo's BBAuth, Amazon's Web Services API, etc. The OAuth is an authentication method that standardizes various authentication methods as such, and applications that use the OAuth authentication method do not need to authenticate each other. As a result, integrated use of multiple applications becomes possible, and the OAuth 2.0 is the latest version of the OAuth. This OAuth 2.0 approach is outlined as below.

When the user wishes to use a service provided by a service-providing server, an authentication request for login is transmitted to the service-providing server from a user device of the user, according to the user's operation.

The service-providing server that has received the authentication request transmits login information to an authentication server. Then the authentication server verifies the login information and if the verification is successfully completed, returns authorization information to the service-providing server.

According to the authorization information, the service-providing server transmits an authorization transfer information to the user device, and the user device that received the authorization transfer information transmits information for requesting an access token to the authentication server, to thereby obtain the access token issued by the authentication server. Then, since the user device can send a request for resource related to the service to the service-providing server by using the access token, a login delegation is completed.

Meanwhile, the service-providing server may request the authentication server to verify the access token in order to confirm whether the access token obtained from the user device is valid, and in response, the authentication server may return attribute information on the user.

Since the conventional OAuth authentication process is performed only by checking whether a user ID (user identification information) and a password match their counterparts, there is still a vulnerability problem of the stolen user ID and the stolen password. A certificate that can be introduced for tighter security, for example, a conventional public certificate, generally requires a large amount of issuing cost and is subject to inconvenience in its use. Therefore, a certificate based on a blockchain is preferred that is much more secure and usable and that replaces the conventional public certificate.

Therefore, the inventors of the present disclosure propose a method that delegates authentication of individuals or servers that is more secure and has more various configurations than a conventional OAuth 2.0 protocol, by using a technique based on the blockchain in addition to the conventional OAuth 2.0 protocol.

SUMMARY OF THE DISCLOSURE

It is another object of the present disclosure to provide a lower-cost technique with stronger security and more effective usability which may replace a conventional procedure, and to provide a method and a server for strengthening security and usability of a conventional OAuth.

Specifically, it is said another object of the present disclosure to provide a method that ultimately prevents forgery and falsification by referring to authentication-related information stored in a private/public blockchain database of a virtual currency and by storing information on an authentication result in the private/public blockchain database.

It is still another object of the present disclosure to strengthen security by verifying a certificate of a service-providing server which receives a service request as well as by verifying a certificate of a user, by using a multi-signed signature value.

It is still yet another object of the present disclosure to strengthen security by using a temporary ID, even when a service is provided to the user without a user ID.

It is still yet another object of the present disclosure to guarantee integrity of a database by performing verification of information using a transaction stored in the blockchain database as above.

It is still yet another object of the present disclosure to provide a login delegation service based on the blockchain with an authentication procedure of individuals and server of various types.

In order to accomplish objects above and characteristic effects to be described later of the present disclosure, distinctive structures of the present disclosure are described as follows.

In accordance with one aspect of the present disclosure, there is provided a method for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, including steps of: (a) on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the service-providing server, if authentication-requesting information which is information for requesting a delegation of the login via the authentication application is acquired from a service-providing application executed on the user device, transmitting or supporting another device to transmit authentication-responding information, which is a result of determining whether the delegation of the login is possible, to the service-providing application; (b) the service-providing server, after an authentication redirection request is transmitted from the service-providing application to the authentication application, if server challenge-requesting information including a variable authentication value, which is generated by the authentication server, is acquired from the authentication application, transmitting or supporting another device to transmit server challenge-responding information corresponding to the server challenge-requesting information to the authentication application, to thereby allow the authentication server to determine whether the server certificate and the application certificate are valid by referring to the blockchain database and the state database; and (c) the service-providing server, if an authentication result message, including information on whether the server certificate and the application certificate are valid, is acquired from the authentication server, and if the authentication result message is an authentication success message representing that the server certificate and the application certificate are valid, transmitting or supporting another device to transmit an access token to the service-providing application, to thereby allow the service-providing application to use the service via the access token.

As one example, at the step of (b), the server challenge-requesting information includes an encoded variable authentication value generated by encoding the variable authentication value with a public key of the server certificate, and wherein the service-providing server acquires the variable authentication value from the server challenge-requesting information by using a private key of the server certificate, and transmits the server challenge-responding information including a signature value, generated by signing the variable authentication value with the private key of the server certificate, to the authentication application.

As one example, the validity conditions VcertA of the certificate are based on at least part of (i) information on the user entity's characteristics, (ii) weather information at a time of using the certificate, (iii) date information at the time of using the certificate, (iv) information on at least one person allowed to use the certificate, and (v) information on a predetermined count of usage of the certificate.

As one example, the blockchain database is a private blockchain database or a public blockchain database.

In accordance with another aspect of the present disclosure, there is provided a method for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, including steps of: (a) on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the authentication server, if challenge-start requesting information is acquired from the authentication application executed on the user device in response to an authentication redirection request corresponding to authentication-requesting information which is information for requesting a delegation of the login via the authentication application executed on the user device, generating a variable authentication value corresponding to the challenge-start requesting information, and transmitting or supporting another device to transmit challenge-start responding information including the variable authentication value to the authentication application, to thereby allow the authentication application to acquire server challenge-responding information, corresponding to server challenge-requesting information for determining whether the server certificate is valid, from the service-providing server; (b) the authentication server, if response-requesting information including a multi-signed signature value is acquired from the authentication application wherein the multi-signed signature value is generated by signing the server challenge-responding information with a private key of the application certificate, determining or supporting another device to determine whether the server certificate and the application certificate are valid by referring to the response-requesting information, the blockchain database, and the state database; and (c) the authentication server (i) transmitting or supporting another device to transmit an authentication result message including information on whether the server certificate is valid to at least one of the authentication application and the service-providing server, (ii) if the authentication result message is an authentication success message representing that the server certificate is valid, allowing the service-providing server to transmit an access token to a service-providing application executed on the user device, and (iii) allowing the service-providing application to use the service via the access token.

As one example, the authentication server manages or supports another device to manage information on an access level to the service-providing server, and determines an authorization level by referring to the access level, and wherein the authentication result message includes information on the authorization level, and wherein whether the server certificate is valid is determined by referring to the authorization level.

As one example, the step of (b) includes steps of: (b1) the authentication server determining whether the multi-signed signature value is valid by using a public key of the server certificate and a public key of the application certificate; and (b2) if the multi-signed signature value is determined as valid, the authentication server (i) executing or supporting another device to execute a bytecode BC1 of a server certificate smart contract, which is a smart contract included in the server certificate, by using a state S1 of the server certificate smart contract as a set of one or more arguments of the BC1, to thereby acquire an execution result of the server certificate smart contract and determine whether the server certificate is valid by referring to the execution result of the server certificate smart contract, and (ii) executing or supporting another device to execute a bytecode BC2 of an application certificate smart contract which is a smart contract included in the application certificate by using a state S2 of the application certificate smart contract as a set of one or more arguments of the BC2, to thereby acquire an execution result of the application certificate smart contract, determine whether the application certificate is valid by referring to the execution result of the application certificate smart contract, and determine whether the server certificate and the application certificate are valid.

As one example, after the step of (b), the method further comprises a step of: (c0) the authentication server (i) storing or supporting another device to store the authentication result message or its processed value in the blockchain database as an authentication result transaction, and (ii) registering or supporting another device to register the execution result of the server certificate smart contract and the execution result of the application certificate smart contract in the state database as each new state S' (SC (VcertA)).

As one example, the method further comprises a step of: (e) the authentication server, by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, verifying or supporting another device to verify each integrity of said (i), said (ii) and said (iii) periodically or in response to an integrity verification request.

As one example, the method further comprises a step of: (f) the authentication server verifying or supporting another device to verify the integrity of the execution result periodically or in response to an integrity verification request by referring to the execution result of individual smart contracts stored in the state database.

In accordance with still another aspect of the present disclosure, there is provided a method for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein an application certificate, which is a certificate of a 2-nd application executed on a user device, is a certificate based on the smart contract, including steps of: (a) on condition that an application certificate-registering transaction corresponding to information on the application certificate or its processed value has been stored in the blockchain database and on condition that a state S(SC (VcertA)) which is a set of one or more arguments of the smart contract SC(VcertA) of the application certificate has been stored in a state database SDB, the service-providing server, if authentication-requesting information including user identification information for identifying the user is acquired from the 2-nd application that received an authentication redirection request, which is information for requesting a delegation of the login via the 2-nd application, from a 1st application executed on the user device, transmitting challenge-start requesting information including the user identification information; (b) the service-providing server, if challenge-start responding information, including a variable authentication value generated by the authentication server, is acquired in response to the challenge-start requesting information, transmitting or supporting another device to transmit application challenge-requesting information including the variable authentication value to the 2-nd application, to thereby allow the 2-nd application to generate a signature value created by signing the variable authentication value with a private key of the application certificate; (c) the service-providing server, if application challenge-responding information including the signature value created by signing the variable authentication value with the private key of the application certificate is acquired, transmitting or supporting another device to transmit the application challenge-responding information to the authentication server, to thereby allow the authentication server to determine whether the application certificate is valid by referring to the blockchain database and the state database; and (d) the service-providing server, if an authentication result message, including information on whether the application certificate is valid, is acquired from the authentication server, and if the authentication result message is an authentication success message representing that the application certificate is valid, transmitting or supporting another device to transmit a temporary ID to the 2-nd application, to thereby allow the 1st application to use the service via (i) the temporary ID and (ii) an access token included in the authentication success message which are transmitted from the 2-nd application to the 1st application.

As one example, the challenge-start requesting information further includes a public key of the server certificate which is a certificate of the service-providing server, wherein the server certificate is a certificate based on the smart contract, wherein the challenge-start responding information includes an encoded variable authentication value generated by encoding the variable authentication value with the public key of the server certificate, and wherein, at the step of (b), the service-providing server acquires the variable authentication value from the challenge-start responding information by using a private key of the server certificate, and transmits the application challenge-requesting information, including the encoded variable authentication value generated by encoding the variable authentication value with the public key of the application certificate, to the 2-nd application.

As one example, the step (a) is performed on condition that a server certificate-registering transaction corresponding to information on the server certificate or its processed value has been further stored in the blockchain database.

As one example, the temporary ID is determined by referring to information on an authorization level and the access token included in the authentication success message.

In accordance with still yet another aspect of the present disclosure, there is provided a method for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein an application certificate which is a certificate of a 2-nd application executed on a user device is a certificate based on the smart contract, including steps of: (a) on condition that an application certificate-registering transaction corresponding to information on the application certificate or its processed value has been stored in the blockchain database and on condition that a state S(SC (VcertA)) which is a set of one or more arguments of the smart contract SC(VcertA) of the application certificate has been stored in a state database SDB, the authentication server, if challenge-start requesting information including user identification information for identifying the user is acquired from the service-providing server, generating or supporting another device to generate a variable authentication value in response to the challenge-start requesting information wherein the service-providing server has acquired authentication-requesting information, including the user identification information, from the 2-nd application that had received an authentication redirection request, which is information for requesting a delegation of the login via the 2-nd application, from a 1st application executed on the user device; (b) the authentication server (i) transmitting or supporting another device to transmit challenge-start responding information including the generated variable authentication value to the service-providing server, (ii) allowing the service-providing server to transmit application challenge-requesting information including the variable authentication value to the 2-nd application, and (iii) allowing the 2-nd application to generate a signature value by signing the variable authentication value with a private key of the application certificate; (c) the authentication server, if application challenge-responding information including the signature value created by signing the variable authentication value with the private key of the application certificate is acquired, determining or supporting another device to determine whether the application certificate is valid by referring to the application challenge-responding information, the blockchain database, and the state database; and (d) the authentication server, (i) transmitting or supporting another device to transmit an authentication result message including information on whether the application certificate is valid to the service-providing server and the 2-nd application, (ii) if the authentication result message is an authentication success message representing that the application certificate is valid, allowing the service-providing server to transmit a temporary ID to the 2-nd application, and (iii) allowing the 1-st application to use the service via (iii-1) the temporary ID and (iii-2) an access token included in the authentication success message which are transmitted from the 2-nd application to the 1st application.

As one example, after the step of (c), the method further comprises a step of: (d0) the authentication server (i) storing or supporting another device to store the authentication result message or its processed value in the blockchain database as an authentication result transaction, and (ii) registering or supporting another device to register the result of the execution in the state database as a new state S'(SC (VcertA)).

As one example, the method further comprises a step of: (e) the authentication server, by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, verifying or supporting another device to verify each integrity of said (i), said (ii) and said (iii) periodically or in response to an integrity verification request.

As one example, the method further comprises a step of: (f) the authentication server verifying or supporting another device to verify the integrity of the result of the execution periodically or in response to an integrity verification request by referring to the result of the execution of individual smart contracts stored in the state database.

In accordance with still yet another aspect of the present disclosure, there is provided a service-providing server for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, including: a communication part, on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the service-providing server, for acquiring authentication-requesting information which is information for requesting a delegation of the login via the authentication application from a service-providing application executed on the user device; and a processor for performing processes of (I) transmitting or supporting another device to transmit authentication-responding information, which is a result of determining whether the delegation of the login is possible, to the service-providing application if the authentication-requesting information is acquired, (II) after an authentication redirection request is transmitted from the service-providing application to the authentication application, if server challenge-requesting information including a variable authentication value, which is generated by the authentication server, is acquired from the authentication application, transmitting or supporting another device to transmit server challenge-responding information corresponding to the server challenge-requesting information to the authentication application, to thereby allow the authentication server to determine whether the server certificate and the application certificate are valid by referring to the blockchain database and the state database and (III) if an authentication result message, including information on whether the server certificate and the application certificate are valid, is acquired from the authentication server, and if the authentication result message is an authentication success message representing that the server certificate and the application certificate are valid, transmitting or supporting another device to transmit an access token to the service-providing application, to thereby allow the service-providing application to use the service via the access token.

As one example, at the process of (II), the server challenge-requesting information includes an encoded variable authentication value generated by encoding the variable authentication value with a public key of the server certificate, and wherein the processor acquires the variable authentication value from the server challenge-requesting information by using a private key of the server certificate, and transmits the server challenge-responding information including a signature value, generated by signing the variable authentication value with the private key of the server certificate, to the authentication application.

As one example, the validity conditions VcertA of the certificate are based on at least part of (i) information on the user entity's characteristics, (ii) weather information at a time of using the certificate, (iii) date information at the time of using the certificate, (iv) information on at least one person allowed to use the certificate, and (v) information on a predetermined count of usage of the certificate.

In accordance with still yet another aspect of the present disclosure, there is provided an authentication server for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, including: a communication part, on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the authentication server, for acquiring challenge-start requesting information from the authentication application executed on the user device in response to an authentication redirection request corresponding to authentication-requesting information which is information for requesting a delegation of the login via the authentication application executed on the user device; and a processor for performing processes of (I) generating a variable authentication value corresponding to the challenge-start requesting information if the challenge-start requesting information is acquired, and transmitting or supporting another device to transmit challenge-start responding information including the variable authentication value to the authentication application, to thereby allow the authentication application to acquire server challenge-responding information, corresponding to server challenge-requesting information for determining whether the server certificate is valid, from the service-providing server, (II) if response-requesting information including a multi-signed signature value is acquired from the authentication application wherein the multi-signed signature value is generated by signing the server challenge-responding information with a private key of the application certificate, determining or supporting another device to determine whether the server certificate and the application certificate are valid by referring to the response-requesting information, the blockchain database, and the state database, and (III) (i) transmitting or supporting another device to transmit an authentication result message including information on whether the server certificate is valid to at least one of the authentication application and the service-providing server, (ii) if the authentication result message is an authentication success message representing that the server certificate is valid, allowing the service-providing server to transmit an access token to a service-providing application executed on the user device, and (iii) allowing the service-providing application to use the service via the access token.

As one example, the processor manages or supports another device to manage information on an access level to the service-providing server, and determines an authorization level by referring to the access level, and wherein the authentication result message includes information on the authorization level, and wherein whether the server certificate is valid is determined by referring to the authorization level.

As one example, the process of (II) includes processes of: (II-1) determining whether the multi-signed signature value is valid by using a public key of the server certificate and a public key of the application certificate; and (II-2) if the multi-signed signature value is determined as valid, (i) executing or supporting another device to execute a bytecode BC1 of a server certificate smart contract, which is a smart contract included in the server certificate, by using a state S1 of the server certificate smart contract as a set of one or more arguments of the BC1, to thereby acquire an execution result of the server certificate smart contract and determine whether the server certificate is valid by referring to the execution result of the server certificate smart contract, and (ii) executing or supporting another device to execute a bytecode BC2 of an application certificate smart contract which is a smart contract included in the application certificate by using a state S2 of the application certificate smart contract as a set of one or more arguments of the BC2, to thereby acquire an execution result of the application certificate smart contract, determine whether the application certificate is valid by referring to the execution result of the application certificate smart contract, and determine whether the server certificate and the application certificate are valid.

As one example, after the process of (II), the processor further performs processes of: (III0-a) storing or supporting another device to store the authentication result message or its processed value in the blockchain database as an authentication result transaction, and (III0-b) registering or supporting another device to register the execution result of the server certificate smart contract and the execution result of the application certificate smart contract in the state database as each new state S'(SC(VcertA)).

As one example, the processor further performs a process of: (V) by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, verifying or supporting another device to verify each integrity of said (i), said (ii) and said (iii) periodically or in response to an integrity verification request.

As one example, the processor further performs a process of: (VI) verifying or supporting another device to verify the integrity of the execution result periodically or in response to an integrity verification request by referring to the execution result of individual smart contracts stored in the state database.

In accordance with still yet another aspect of the present disclosure, there is provided a service-providing server for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein an application certificate, which is a certificate of a 2-nd application executed on a user device, is a certificate based on the smart contract, including: a communication part, on condition that an application certificate-registering transaction corresponding to information on the application certificate or its processed value has been stored in the blockchain database and on condition that a state S(SC(VcertA)) which is a set of one or more arguments of the smart contract SC(VcertA) of the application certificate has been stored in a state database SDB, the service-providing server, for acquiring authentication-requesting information including user identification information for identifying the user from the 2-nd application that received an authentication redirection request, which is information for requesting a delegation of the login via the 2-nd application, from a 1st application executed on the user device; and a processor for performing processes of (I) transmitting challenge-start requesting information including the user identification information if the authentication-requesting information is acquired, (II) if challenge-start responding information, including a variable authentication value generated by the authentication server, is acquired in response to the challenge-start requesting information, transmitting or supporting another device to transmit application challenge-requesting information including the variable authentication value to the 2-nd application, to thereby allow the 2-nd application to generate a signature value created by signing the variable authentication value with a private key of the application certificate, (III) if application challenge-responding information including the signature value created by signing the variable authentication value with the private key of the application certificate is acquired, transmitting or supporting another device to transmit the application challenge-responding information to the authentication server, to thereby allow the authentication server to determine whether the application certificate is valid by referring to the blockchain database and the state database, and (IV) if an authentication result message, including information on whether the application certificate is valid, is acquired from the authentication server, and if the authentication result message is an authentication success message representing that the application certificate is valid, transmitting or supporting another device to transmit a temporary ID to the 2-nd application, to thereby allow the 1st application to use the service via (i) the temporary ID and (ii) an access token included in the authentication success message which are transmitted from the 2-nd application to the 1st application.

As one example, the challenge-start requesting information further includes a public key of the server certificate which is a certificate of the service-providing server, wherein the server certificate is a certificate based on the smart contract, wherein the challenge-start responding information includes an encoded variable authentication value generated by encoding the variable authentication value with the public key of the server certificate, and wherein, at the step of (b), the service-providing server acquires the variable authentication value from the challenge-start responding information by using a private key of the server certificate, and transmits the application challenge-requesting information, including the encoded variable authentication value generated by encoding the variable authentication value with the public key of the application certificate, to the 2-nd application.

In accordance with still yet another aspect of the present disclosure, there is provided an authentication server for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein an application certificate which is a certificate of a 2-nd application executed on a user device is a certificate based on the smart contract, including: a communication part, on condition that an application certificate-registering transaction corresponding to information on the application certificate or its processed value has been stored in the blockchain database and on condition that a state S(SC(VcertA)) which is a set of one or more arguments of the smart contract SC(VcertA) of the application certificate has been stored in a state database SDB, the authentication server, for acquiring challenge-start requesting information including user identification information for identifying the user from the service-providing server wherein the service-providing server has acquired authentication-requesting information, including the user identification information, from the 2-nd application that had received an authentication redirection request, which is information for requesting a delegation of the login via the 2-nd application, from a 1st application executed on the user device; and a processor for performing processes of (I) if the challenge-start requesting information is acquired, generating or supporting another device to generate a variable authentication value in response to the challenge-start requesting information, (II) (i) transmitting or supporting another device to transmit challenge-start responding information including the generated variable authentication value to the service-providing server, (ii) allowing the service-providing server to transmit application challenge-requesting information including the variable authentication value to the 2-nd application, and (iii) allowing the 2-nd application to generate a signature value by signing the variable authentication value with a private key of the application certificate, (III) if application challenge-responding information including the signature value created by signing the variable authentication value with the private key of the application certificate is acquired, determining or supporting another device to determine whether the application certificate is valid by referring to the application challenge-responding information, the blockchain database, and the state database, and (IV) (i) transmitting or supporting another device to transmit an authentication result message including information on whether the application certificate is valid to the service-providing server and the 2-nd application, (ii) if the authentication result message is an authentication success message representing that the application certificate is valid, allowing the service-providing server to transmit a temporary ID to the 2-nd application, and (iii) allowing the 1st application to use the service via (iii-1) the temporary ID and (iii-2) an access token included in the authentication success message which are transmitted from the 2-nd application to the 1st application.

As one example, after the process of (III), the processor further performs processes of: (IV0-a) storing or supporting another device to store the authentication result message or its processed value in the blockchain database as an authentication result transaction, and (IV0-b) registering or supporting another device to register the result of the execution in the state database as a new state S'(SC(VcertA)).

As one example, the processor further performs a process of: (V) by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, verifying or supporting another device to verify each integrity of said (i), said (ii) and said (iii) periodically or in response to an integrity verification request.

As one example, the processor further performs a process of: (VI) verifying or supporting another device to verify the integrity of the result of the execution periodically or in response to an integrity verification request by referring to the result of the execution of individual smart contracts stored in the state database.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIGS. 6 and 7 are drawings exemplarily illustrating a smart contract, which is a source code, with its usage count of certificates limited to initNumber and ten respectively, in accordance with the third example embodiment of the present disclosure.

DETAILED DESCRIPTION OF THE PREFERRED EMBODIMENTS

Figure 1:
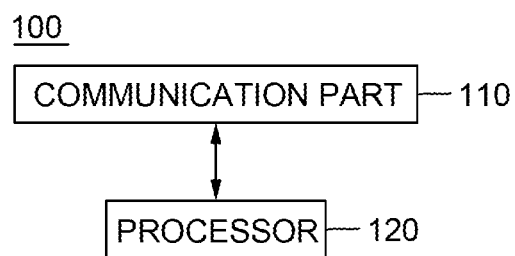
FIG. 1 is a drawing schematically illustrating an exemplary configuration of a service-providing server, an authentication server, and a user device performing a delegation method for a login in accordance with a first example embodiment to a third example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure. Also, throughout the present specification, a particular function used in the present disclosure may be a hashing function, a function value may be a hash value generated by using the hashing function, a particular tree may be a Merkle tree or a Patricia tree, and a representative function value of the particular tree may be a root value of the Merkle tree, but the scope of the present disclosure is not limited thereto.

Throughout the present specification, a "database" may be systematic data, i.e., integral sets of managed information and its management system, and may include at least part of a general relational database, MongoDB, and a blockchain database, but the scope of the present disclosure is not limited thereto. The present specification describes a blockchain database of a virtual currency for convenience of explanation, but those skilled in the art understand that the method in accordance with the present disclosure may be implemented to cover various modifications and equivalent arrangements with other types of databases.

In this specification, a "public blockchain database" indicates every computing device, on a system that resides over a public blockchain which is a blockchain used by public, utilized as a database.

Further, in this specification, a "private blockchain database" may indicate a database using an independently configured private blockchain which is managed directly by the authentication server of the present disclosure, not the public blockchain.

The virtual currency may be digital currency distributed by transactions based on digital wallets of blockchain technology, such as Bitcoin, Litecoin, Darkcoin, Namecoin, Dogecoin, Ripple, etc.

In the present specification, a "smart contract" may represent a source code which is compiled into a byte code capable of an execution on at least one computing device, and may be configured to perform at least one predetermined procedure if one or more validity conditions are satisfied at a time of the execution. An integrity resulting from the execution is verified by a consensus outputted from the computing device.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure. The headings and abstract of the present disclosure provided herein are for convenience only and do not limit or interpret the scope or meaning of the embodiments.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views. As used in this specification and the appended claims, the singular forms "a," "an," and "the" include plural referents unless the content and context clearly dictates otherwise. Also, throughout the present specification, a term "specific" is added to terms or concepts related to one or more major subjects which are active in taking actions, and a term "associated" is added to terms or concepts related to other nodes in a same Merkle tree which includes a specific node and/or to values included in said other nodes. However, the term "specific" and the term "associated" may be omitted, as the case may be.

A first example embodiment in accordance with the present disclosure discloses a configuration of using an unspent transaction output, i.e., UTXO, of the virtual currency, that is, recording individual transactions about the UTXO in a blockchain database.

A second example embodiment in accordance with the present disclosure discloses a configuration of anchoring that seeks two-fold integrity of recorded information, by recording the individual transactions about the UTXO in a first blockchain database and then recording a representative function value, created from the transactions recorded in the first blockchain database, in the second blockchain database.

A third example embodiment in accordance with the present disclosure discloses a configuration of utilizing a state database, i.e., an SDB, for managing information on a state of a certificate, where the state varies according to a smart contract, recording a transaction in the blockchain database, and recording a change of the state in the state database.

For reference, in accordance with the present disclosure, the first blockchain database may be a blockchain database where data is stored directly, and the second blockchain database may be a blockchain database where the data is stored indirectly via the first blockchain database for ensuring integrity of the data.

Unless otherwise noted in this specification or clearly contradicted in the context, an item indicated in the singular includes those in the plural, unless otherwise required in the context. These embodiments will be described in sufficient detail by referring to attached drawings regarding the embodiments of the present disclosure to allow those skilled in the art to practice the disclosure.

FIG. 1 is a drawing schematically illustrating an exemplary configuration of a service-providing server, an authentication server, and a user device performing a delegation method for a login in accordance with the present disclosure.

By referring to FIG. 1, the authentication server, the service-providing server, and the user device may typically perform the method in accordance with the present disclosure by using combinations of at least one computing device 100 and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software, and the computing device 100 as such may include a communication part 110 and a processor 120, and may communicate with each other directly or indirectly.

The communication part 110 of such computing devices may transmit requests and receive responses with other linked devices. As one example, such requests and responses may be carried out by the same TCP session, but they are not limited to these. For example, they could be transmitted and received as UDP datagrams.

Also, the processor 120 of such devices may include hardware configuration of MPU (Micro Processing Unit) or CPU (Central Processing Unit), cache memory, data bus, etc. Additionally, any OS and software configuration of applications that achieve specific purposes may be further included.

First Example Embodiment

The delegation method for the login in accordance with the first example embodiment of the present disclosure is described as follows.

Figure 2:
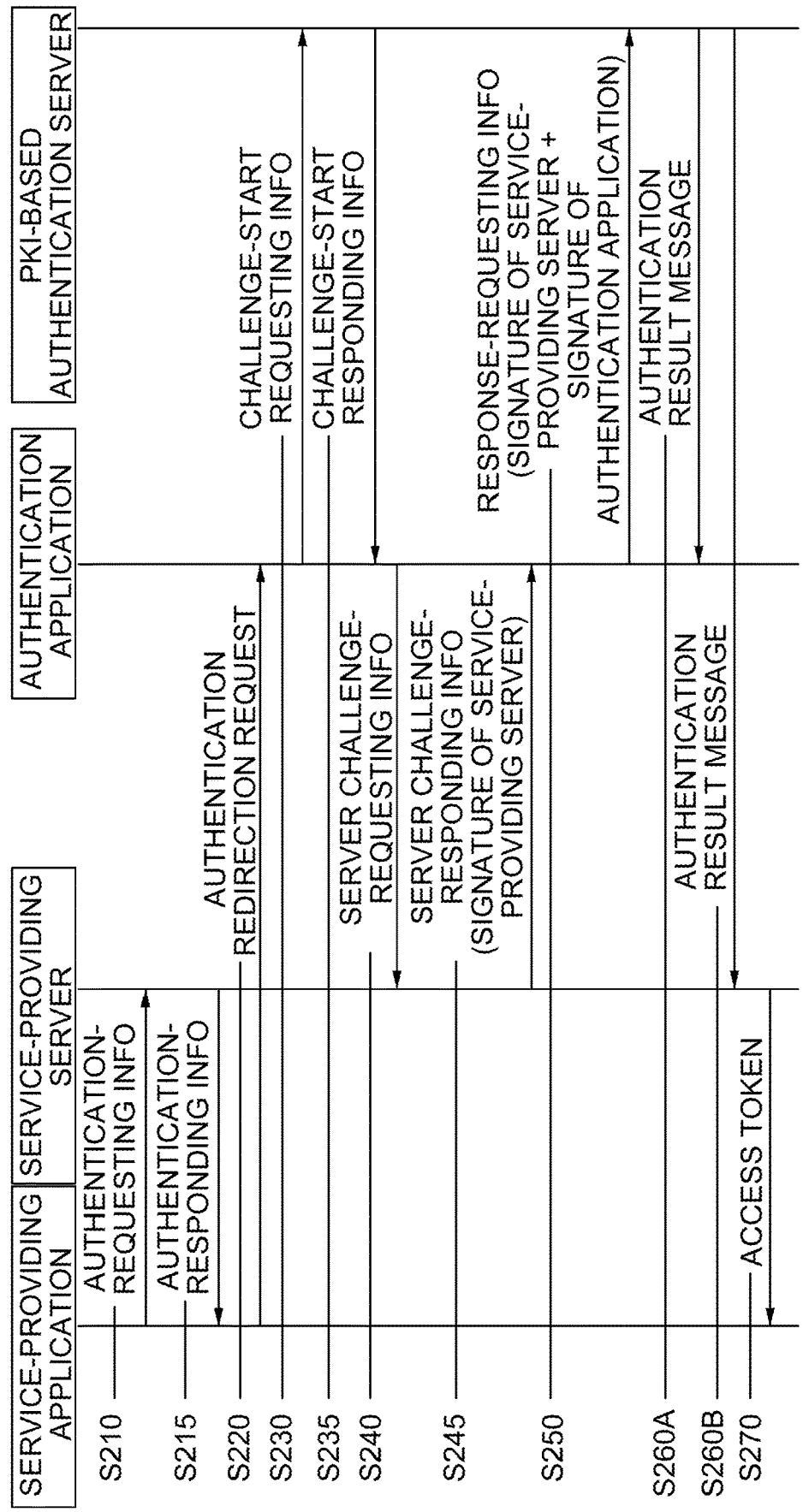
FIG. 2 is a sequence diagram schematically illustrating the delegation method for the login via multiple-signing using a server certificate and an application certificate in accordance with the first example embodiment to the third example embodiment of the present disclosure.

FIG. 2 is a sequence diagram schematically illustrating the method for delegating the login via multiple-signing using a server certificate and an application certificate, which is referred to as a "delegation method for multi-signed login" in accordance with the present disclosure.

By referring to FIG. 2, the delegation method for multi-signed login in accordance with the first example embodiment of the present disclosure may include steps as follows: if authentication-requesting information, which is information for requesting a delegation of the login via an authentication application executed on the user device, is acquired from a service-providing application executed on the user device at a step of S210, the service-providing server transmits authentication-responding information, which is a result of determining whether a delegation of the login is possible, to the service-providing application at a step of S215.

Herein, the authentication-requesting information may include auth type information which is information for specifying a type of the authentication. For example, the auth type information may be parameters for allowing selection of the type of the authentication according to a degree of importance of services, such as a simple service (with a low degree of importance) like an inquiry or a complex service (with a high degree of importance) like a payment.

Also, the authentication-requesting information may include authentication application identification information for identifying the authentication application, and the service-providing server which acquired the authentication application identification information may determine whether the delegation of the login is possible, based on information as to (i) whether the service provided by the service-providing server admits the delegation of the login via the authentication application, (ii) whether the delegation of the login is allowed for a user if the service admits the delegation of the login via the authentication application, etc. and its result may be returned as authentication-responding information.

For example, the authentication-requesting information may further include at least part of information to be used for identifying the user device and information to be used for identifying the service-providing application, but the scope of the present disclosure is not limited thereto, and those skilled in the art may utilize various criteria to be used by the service-providing server for allowing the delegation of the login via the authentication application.

The authentication-responding information may include at least part of the authentication application identification information, an authorization level, service-providing server identification information for identifying the service-providing server, and a referrer service key.

Herein, the authorization level may represent grades, ranges, and degrees of the service provided by the service-providing server, as a result of the user using the delegation of the login in accordance with the present disclosure, may be a value provided by the authentication server each time the login is delegated, and may be set as equal to or lower than the access level which is a value set as unique by the authentication server to the relevant service-providing server. The access level may be set by the authentication server when the server certificate which is a certificate of the service-providing server is registered, and its detail will be described later.

Herein, the referrer service key may be used for determining consistency of a session in which the delegation method for the login in accordance with the present disclosure is performed, and may be a value provided by the service-providing server.

Meanwhile, the processes of S210 and S215 in the first example embodiment may be performed on condition that a server certificate-registering transaction corresponding to information on the server certificate, which is a certificate of the service-providing server, or its processed value and an application certificate-registering transaction corresponding to information on the application certificate, which is a certificate of the authentication application, or its processed value have been stored in the blockchain database. Herein, the blockchain database may be a private blockchain database or a public blockchain database.

In the present specification, the certificates, i.e., the server certificate and the application certificate, may be certificates based on a public key and a private key generated by using encryption based on the PKI.

Information on the certificates that can be transmitted to the authentication server when the certificates are being registered may include, for example, (i) a public key PubA generated based on the PKI, may further include (ii) an identification information function value IdhashA which is generated by applying a particular operation to identification information for identifying a user entity of the certificate, and may further include at least part of additional information such as (iii) a crypto type as information for identifying at least one of a type of encryption based on the PKI and a type of the particular operation, (iv) a license key, and (v) a license level. Herein, the user entity may represent at least one of the user or a service provider, and the user entity may have a right to use the certificate.

Specifically, the license key may be information upon which a managing party of the service-providing server and a managing party of the authentication server have agreed beforehand. Therefore, if the license key is different from what has been agreed upon, or if a format of the license key does not follow a predetermined regulation, information transmitted to the authentication server may be determined as a traffic for cracking. Meanwhile, the managing party of the authentication server may deactivate the license key if a contract with the managing party of the service-providing server is terminated.

Also, the license level may represent grades, ranges, and degrees of the service provided to the service-providing server by the authentication server for delegating the login, and the license level may be set beforehand by the agreement.

As another example, the information on the certificate may further include information generated while the certificate is registered, in response to said (i) to said (v) acquired by the authentication server, and may be at least part of the access level and certificate identification information for identifying the certificates. If the certificate is the server certificate, the certificate identification information may be used for identifying the server certificate, and if the certificate is the application certificate, the certificate identification information may be used for identifying the application certificate.

This access level may represent ranges and degrees of the services accessible based on the certificate when the login delegation service via the certificate is provided, and the license level may be unique between the authentication server and the service-providing server, but the access level may be unique to the certificate and may be provided to the service-providing server by the authentication server when the server certificate is issued. The access level may be set as equal to or lower than the license level by the authentication server.

Also, the identification information function value IdhashA may be generated by applying the particular operation to information on a corporate body or an individual which is identification information of the user entity who uses the service, for example, the service provider who uses the service-providing server, the user who uses the authentication application or the 2-nd application on the user device, etc. The identification information may include, for example, at least one of a brand name (a name), a date of foundation (a birth date), contact information, and e-mail addresses, but the scope of the present disclosure is not limited thereto, as those skilled in the art may understand.

Particular functions used for the particular operation may include an MD4 function, an MD5 function, an SHA-0 function, an SHA-1 function, an SHA-224 function, an SHA-256 function, an SHA-384 function, an SHA-512 function and a HAS-160 function, but the scope of the present disclosure is not limited thereto. For example, a Triple SHA256 function may also be included.

Meanwhile, each integrity of the server certificate and the application certificate may be verified by referring to the server certificate registering transaction and the application certificate registering transaction stored in the blockchain database. This will be described in detail later.

Next, the delegation method for multi-signed login in accordance with the first example embodiment of the present disclosure may further include steps as follows: after an authentication redirection request is transmitted from the service-providing application to the authentication application at a step of S220, if server challenge-requesting information including a variable authentication value, which is generated by the authentication server, is acquired from the authentication application at steps of S230 and S235, the service-providing server transmits server challenge-responding information corresponding to the server challenge-requesting information to the authentication application at a step of S240, to thereby allow the authentication server to determine whether the server certificate which is a certificate of the service-providing server and the application certificate which is a certificate of the authentication application are valid at steps of S245 to S250.

Herein, the authentication redirection request may include at least part of (i) service-providing application identification information to be used for identifying the service-providing application, (ii) service type information to be used for identifying a type of the provided services, (iii) the authorization level, (iv) service-providing server identification information to be used for identifying the service-providing server, and (v) a referrer service key.

Also, the variable authentication value may be used for verifying each validity of the server certificate and the application certificate, and may be a series of numbers for single use, and for example, may be a time-stamp, but the scope of the present disclosure is not limited thereto. For example, the variable authentication value may be a random nonce, i.e., a random value, generated by using an arbitrary seed. Further details on various methods to create the variable authentication value will not be explained, since it is not necessary for understanding the present disclosure, but these may be known or easily understood by those skilled in the art.

And herein, the server challenge-requesting information may further include at least part of the referrer auth key and the referrer service key. The referrer auth key may be provided by the authentication server to be used for determining by which authentication application and by which service-providing server a challenge-start request is transmitted, that is, to be used for identifying the authentication application and the service-providing server, when the user uses the delegation method of the login in accordance with the present disclosure. The referrer auth key may be included in challenge-start responding information transmitted from the authentication server to the authentication application, and the challenge-start responding information will be described later.

Meanwhile, the server challenge-responding information corresponding to the server challenge-requesting information may further include at least part of the referrer auth key, the service type information, the authorization level, and the service-providing server identification information.

In the encryption based on the PKI, used in the present disclosure, of information transmitted and received among entities which process the above methods, information to be transmitted by a sender is encoded by using a public key of a receiver of the information, in general. The receiver may acquire the information to be transmitted by decoding the encoded information by using a private key of the receiver. In this case, more specifically, the server challenge-requesting information may include an encoded variable authentication value generated by encoding the variable authentication value with a public key of the server certificate. Then, the service-providing server may acquire the variable authentication value from the server challenge-requesting information by using a private key of the server certificate, and may transmit the server challenge-responding information including a signature value generated by signing the variable authentication value with the private key of the server certificate to the authentication application. However, the information to be transmitted is not always encoded by using the public key of the receiver of the information. For example, a well-known symmetric-key algorithm may be used.

After the steps S220 to S250, the delegation method for multi-signed login in accordance with the first example embodiment of the present disclosure may further include steps as follows: if an authentication result message, including information on whether the server certificate and the application certificate are valid, is acquired from the authentication server at steps of S260A and 260B, and if the authentication result message is an authentication success message representing that the server certificate and the application certificate are valid, the service-providing server transmits an access token to the service-providing application at a step of S270, to thereby allow the service-providing application to use the service via the access token. As a result, the login is completed.

Herein, the authentication result message may further include the application certificate identification information, and may further include at least part of the the service-providing application identification information and the service-providing server identification information.

Also, the access token may be information which is transmitted by the user device to the service-providing server, where the the service-providing application is executed on the user device for use of the service, and may be an alphanumerical string in ASCII or binary values. The access token may be a unique value for identifying the user of the service-providing application and must be stored secretly. Therefore, the access token may be transmitted by using the encryption based on the PKI. The access token may be invalidated when it expires, if an issuer thereof sets an expiration date.

As an example, the access token may be an access token provided by an OAuth authentication procedure, in which case the access token may be a combination of alphanumerics and symbols. For example, the access token provided by the OAuth authentication procedure may be in a form such as "fb2e77d.47a0479900504cb3ab4a1f626d174d2d", and those skilled in the art understand the exemplar access token used by the OAuth authentication procedure.

To describe again the delegation method for multi-signed login from a perspective of the authentication server in accordance with the first example embodiment of the present disclosure as aforementioned, the delegation method for multi-signed login may include steps as follows: authentication-requesting information, which is information for requesting the delegation of the login via the authentication application executed on the user device, is transmitted to the service-providing server at a step of S210. And in response to the authentication redirection request corresponding to the authentication-requesting information at a step of S220, if the challenge-start requesting information is acquired from the authentication application executed on the user device at a step of S230, the authentication server generates the variable authentication value corresponding to the challenge-start requesting information, and transmits the challenge-start responding information including the variable authentication value to the authentication application at a step of S235. And the server challenge-requesting information for determining whether the server certificate which is a certificate of the service-providing server is valid is transmitted to the service-providing server at a step of S240, and the authentication server allows the authentication application to acquire the server challenge-responding information from the service-providing server at a step of S245.

Herein, the challenge-start requesting information may include at least part of the application certificate identification information for identifying the application certificate, the service-providing application identification information, and the referrer service key.

The challenge-start responding information corresponding to the challenge-start requesting information may further include at least one of the referrer auth key and the referrer service key. As aforementioned, the referrer auth key may be provided by the authentication server to be used for determining by which authentication application and by which service-providing server the challenge-start request is transmitted, that is, to be used for identifying the authentication application and the service-providing server, when the user uses the delegation method of the login in accordance with the present disclosure.

Next, the delegation method for multi-signed login in accordance with the first example embodiment of the present disclosure may further include a step as follows: if response-requesting information, including a multi-signed signature value, is acquired from the authentication application wherein the multi-signed signature value is generated by signing the server challenge-responding information with the private key of the application certificate which is a certificate of the authentication application, then the authentication server determines whether the server certificate and the application certificate are valid using the response-requesting information at a step of S250.

Herein, the response-requesting information may further include at least part of the referrer auth key, the service type information, the authorization level, and the service-providing server identification information.

At the step of S250, the authentication server may determine whether the server certificate and the application certificate are valid, by verifying the multi-signed signature value using the public key of the server certificate and the public key of the application certificate. In this case, a function value A may be acquired from the multi-signed signature value by using the public key of the server certificate and the public key of the application certificate, and a validity of the signature may be verified by comparing the function value A and a result B of applying the particular function to the variable authentication value. In the comparison, it is known to those skilled in the art that the signature is valid if the function value and the result of applying the particular function are identical and that the signature is invalid if they are not, therefore those skilled in the art may understand how to verify the signature, i.e., an electronic signature.

Meanwhile, regarding the step of S250, the authentication server may manage or support another device to manage information on the access level to the service-providing server, and may determine the authorization level by referring to the access level, in which case, the authentication result message may include the information on the authorization level, and whether the server certificate is valid may be determined by referring to the authorization level.

For example, the access level may be grade information which is determined based on cracking history information related to whether the service-providing server has been cracked before, and the number of times and frequency if it has, or information such as functions and performance of a security service that can be provided by the service-providing server, and the license level. As in the aforementioned example where the certificate is registered, this access level may be set while the certificate is being registered, but the scope of the present disclosure is not limited thereto, and those skilled in the art understand that the access level may change in time as the case may be.

Meanwhile, the authorization level determined according to the access level may correspond to information representing a service privilege level if the services allowed to the user of the services via the service-providing server are ranked according to the service privilege level. Also, the authorization level may be used for determining a period of time to use the service with a single login. Also, the managing party of the authentication server may easily change the access level or the authorization level if the login delegation service needs to be restricted due to reasons such as the service-providing server being under cracking attack, etc.

Next, the delegation method for multi-signed login in accordance with the first example embodiment of the present disclosure may further include steps as follows: the authentication server transmits the authentication result message including information on whether the server certificate is valid to at least one of the authentication application and the service-providing server at steps of S260A and S260B. Then if the authentication result message is the authentication success message representing that the server certificate is valid, the authentication server allows the service-providing server to transmit the access token to the service-providing application executed on the user device at a step of S270 and allows the service-providing application to use the service via the access token. As a result, the login is completed. In a sequence diagram of FIG. 2, the step of S260A is shown as being performed before the step of S260B, but their order may be reversed, or the steps of S260A and S260B may be performed simultaneously.

Meanwhile, the delegation method for multi-signed login in accordance with the first example embodiment of the present disclosure may further include a step (not illustrated) as follows: after the step of S250, the authentication server stores or supports another device to store the authentication result message or its processed value in the blockchain database as an authentication result transaction. As a result of storing the authentication result transaction in the blockchain database, a managing party using the authentication server or a third party authorized to access the blockchain database may verify an authenticity of the authentication result message and may also manage statistics of the multiple authentication result message.

Also, the delegation method for multi-signed login in accordance with the first example embodiment of the present disclosure may further include steps (not illustrated) as follows: by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, the authentication server verifies or supports another device to verify each integrity of said (i), said (ii) and said (iii) periodically or in response to an integrity verification request.

Figure 3:
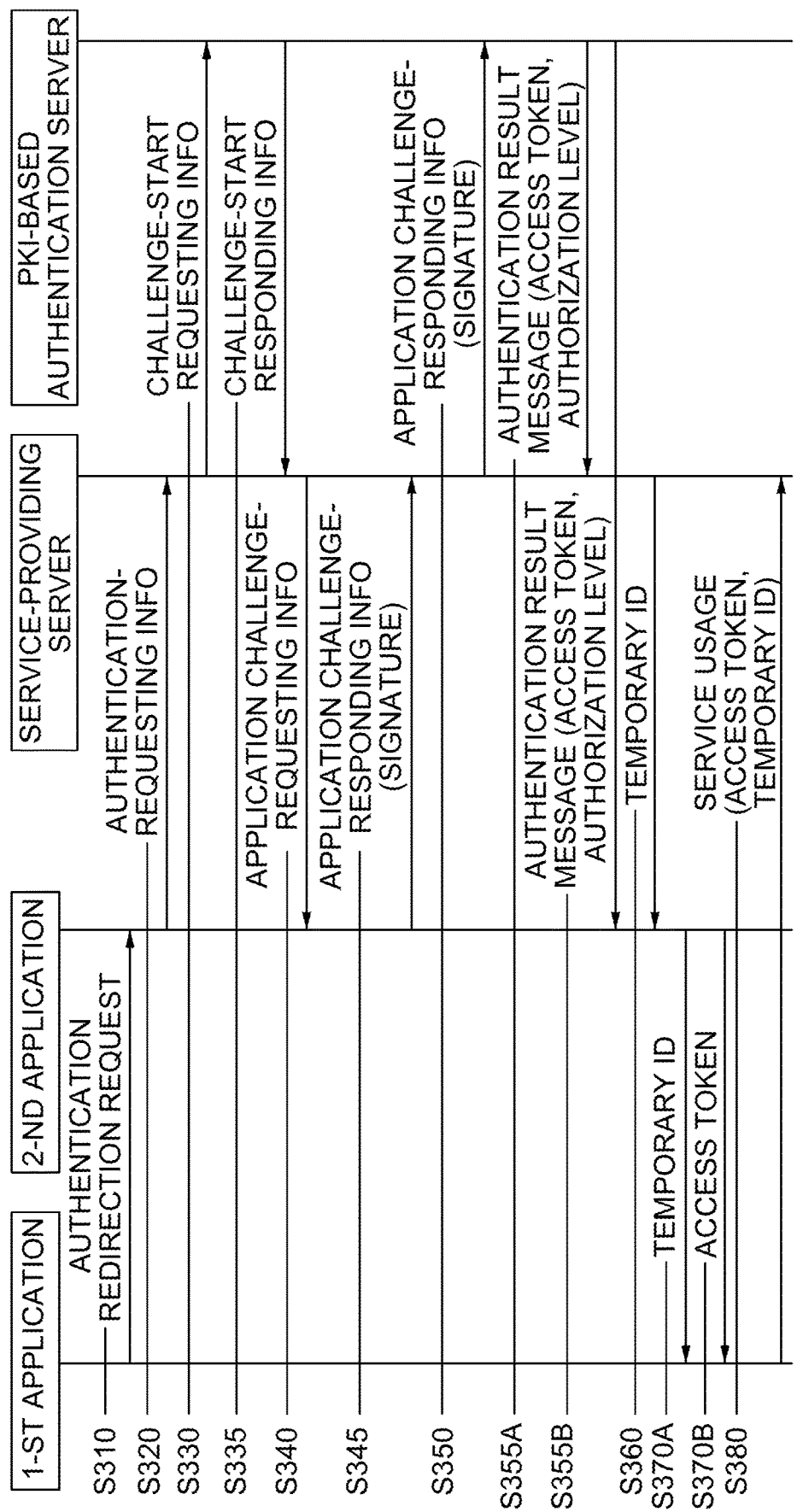
FIG. 3 is a sequence diagram schematically illustrating the delegation method for the login via multiple-information when a user ID is unavailable in accordance with the first example embodiment to the third example embodiment of the present disclosure.

Next, FIG. 3 is a sequence diagram schematically illustrating the method, i.e., a "delegation method for temporary ID login", for delegating the login via multiple-information when a user ID is unavailable in accordance with the present disclosure. Below, the technological characteristics identical to those of the delegation method for multi-signed login in accordance with the aforementioned first example embodiment will be omitted, and only specific details will be disclosed.

By referring to FIG. 3, the delegation method for temporary ID login in accordance with the first example embodiment of the present disclosure may include steps as follows: if a 2-nd application receives the authentication redirection request at a step of S310, which is information for requesting the delegation of the login via the 2-nd application executed on the user device, from a 1st application executed on the user device, and if the authentication-requesting information including the user identification information for identifying the user is acquired from the 2-nd application at a step of S320, then the service-providing server transmits the challenge-start requesting information including the user identification information at a step of S330.

Herein, the user identification information may be information for identifying and distinguishing the user from other users, and any information determined as unique to each user may suffice. For example, the user identification information may be login information for using the services provided via the 2-nd application, or may be certificate information issued to the user.

Also, similar to the delegation method for multi-signed login in accordance with the first example embodiment of the present disclosure, the steps of S310 to S330 may be performed on condition that the server certificate-registering transaction corresponding to information on the server certificate, which is a certificate of the service-providing server, or its processed value and an application certificate-registering transaction corresponding to information on the application certificate, which is a certificate of the 2-nd application, or its processed value have been stored in the blockchain database.

Next, the delegation method for temporary ID login in accordance with the first example embodiment of the present disclosure may further include steps as follows: if the challenge-start responding information, including the variable authentication value generated by the authentication server, is acquired in response to the challenge-start requesting information at a step of S335, the service-providing server transmits the application challenge-requesting information including the variable authentication value to the 2-nd application at a step of S340, to thereby allow the 2-nd application to generate a signature value created by signing the variable authentication value with the private key of the application certificate which is a certificate of the 2-nd application.

As an example of application of the encryption based on the PKI used in the present disclosure, the challenge-start requesting information may further include the public key of the server certificate which is a certificate of the service-providing server, in which case the challenge-start responding information may include the encoded variable authentication value generated by encoding the variable authentication value with the public key of the server certificate. Then, in this example, the service-providing server may acquire the variable authentication value from the challenge-start responding information by using the private key of the server certificate at a step of S335, and may transmit the application challenge-requesting information, including the encoded variable authentication value generated by encoding the variable authentication value with the public key of the application certificate, to the 2-nd application at a step of S340.

By referring to FIG. 3 again, after the steps of S335 and S340, the delegation method for temporary ID login in accordance with the first example embodiment of the present disclosure may further include steps as follows: if the application challenge-responding information, including the signature value created by signing the variable authentication value with the private key of the application certificate, is acquired at a step of S345, the service-providing server transmits the application challenge-responding information to the authentication server, to thereby allow the authentication server to determine whether the application certificate is valid by using the application challenge-responding information at a step of S350.

Because the application challenge-responding information includes the signature value generated by signing with the private key of the application certificate, whether the signature value corresponds to the variable authentication value may be verified by using the public key of the application certificate retained by the authentication server, and as a result, whether the application certificate is valid may be determined. Its explanation is similar to that of the aforementioned method for verifying the validity of the signature, and thus omitted.

After the steps of S345 and S350, the delegation method for temporary ID login in accordance with the first example embodiment of the present disclosure may further include steps as follows: if the authentication result message including information on whether the application certificate is valid is acquired from the authentication server, and if the authentication result message is the authentication success message representing that the application certificate is valid, the service-providing server transmits a temporary ID to the 2-nd application, to thereby allow the 1st application to use the service via (i) the temporary ID and (ii) an access token included in the authentication success message which are transmitted from the 2-nd application to the 1st application.

Herein, the temporary ID may be determined by referring to information on the authorization level and the access token included in the authentication success message. Also, the temporary ID may be an access ID to be used for accessing the service-providing server. For example, the temporary ID may be assigned with information on the service privilege level representing the services that can be used according to characteristics of the services provided by the service-providing server, and the user who uses the service via the 1st application with the temporary ID may be allowed to use the services within a range determined by the service privilege level.

To describe again the aforementioned delegation method for temporary ID login in accordance with the first example embodiment of the present disclosure from a perspective of the authentication server, the delegation method for temporary ID login may include steps as follows: if the 2-nd application receives the authentication redirection request, which is information for requesting the delegation of the login via the 2-nd application executed on the user device, from the 1st application executed on the user device, if the service-providing server acquires the authentication-requesting information, including the user identification information for identifying the user, from the 2-nd application, and if the challenge-start requesting information including the user identification information is acquired from the service-providing server, the authentication server generates the variable authentication value in response to the challenge-start requesting information at steps of S310 to S330, the authentication server transmits the challenge-start responding information including the variable authentication value to the service-providing server at a step of S335, to thereby allow the service-providing server to transmit the application challenge-requesting information including the variable authentication value to the 2-nd application at a step of S340, and allow the 2-nd application to generate a signature value created by signing the variable authentication value with the private key of the application certificate which is a certificate of the 2-nd application, and if the application challenge-responding information including the signature value created by signing the variable authentication value with the private key of the application certificate is acquired, the authentication server determines whether the application certificate is valid by using the application challenge-responding information at steps of S345 and S350.

Similar to the delegation method for multi-signed login in accordance with the first example embodiment of the present disclosure, the delegation method for temporary ID login in accordance with the first example embodiment may further include a step (not illustrated) as follows: the authentication server stores or supports another device to store the authentication result message or its processed value in the blockchain database as the authentication result transaction.

By referring to FIG. 3 again, the delegation method for temporary ID login in accordance with the first example embodiment of the present disclosure may further include steps as follows: after the steps of S345 and S350, the authentication server transmits the authentication result message including information on whether the application certificate is valid to the service-providing server and the 2-nd application. If the authentication result message is the authentication success message representing that the application certificate is valid, the authentication server allows the service-providing server to transmit a temporary ID to the 2-nd application. And via (i) the temporary ID and (ii) an access token included in the authentication success message which are transmitted from the 2-nd application to the 1st application at steps of S355A and S370B, the authentication server allows the 1st application to use the service at a step of S380. In a sequence diagram of FIG. 3, the step of S355A is shown as being performed before the step of S355B, but their order may be reversed, or the steps of S355A and S355B may be performed simultaneously. The same applies to the steps of S370A and S370B.

Meanwhile, the delegation method for temporary ID login in accordance with the first example embodiment of the present disclosure may also further include steps (not illustrated) as follows: by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, the authentication server verifies or supports another device to verify each integrity of said (i), said (ii) and said (iii) periodically or in response to the integrity verification request.

Second Example Embodiment

Next, the second example embodiment of the method for delegating the login in accordance with the present disclosure is disclosed. Below, the technological characteristics identical to those of the aforementioned first example embodiment will be omitted, and only specific details will be disclosed.

By referring to FIG. 2 again, in the delegation method for multi-signed login in accordance with the second example embodiment of the present disclosure, the aforementioned steps S210 and S215 regarding the first example embodiment may be performed on condition that a first representative hash value or its processed value and a second representative hash value or its processed value have been stored in the blockchain database. Herein, the first representative hash value is calculated by using both (i) a first specific hash value which is a hash value of a server certificate registering transaction corresponding to information on the server certificate or its processed value and (ii) its corresponding at least one neighboring hash value which is one of hash values including (ii-1) a hash value of an associated server certificate registering transaction corresponding to information on an associated server certificate or its processed value, (ii-2) a hash value of an associated application certificate registering transaction corresponding to information on an associated application certificate or its processed value, and (ii-3) a hash value of an associated authentication result transaction corresponding to an associated authentication result message or its processed value. And herein, the second representative hash value is calculated by using both (i) a second specific hash value which is a hash value of the application certificate registering transaction corresponding to information on the application certificate which may be a certificate of the authentication application executed on the user device and (ii) its corresponding at least one neighboring hash value. Herein, the information on the server certificate may be the server certificate which is a certificate of the service-providing server.

Thereafter, at the steps of S230 and S235, the authentication server may refer to the blockchain database when determining whether the server certificate and the application certificate are valid. Specifically, each validity of the server certificate and the application certificate may be verified by using the server certificate registering transaction and the application certificate registering transaction acquired by referring to the blockchain database.

The second example embodiment in accordance with the present disclosure discloses a configuration of anchoring that seeks two-fold integrity of recorded information, by recording individual transactions about UTXO in the first blockchain database and then recording a representative hash value, created from the transactions recorded in the first blockchain database, in the second blockchain database. In this case, and steps of S210 and S215 may be performed on condition that the server certificate registering transaction and the application certificate registering transaction have been further stored in the first blockchain database.

To describe the anchoring more specifically, the delegation method for multi-signed login in accordance with the second example embodiment of the present disclosure may further include steps (not illustrated) as follows: after the step of S250, the authentication server (A) stores or supports another device to store the authentication result message or its processed value in the first blockchain database as the authentication result transaction, and (B) if one of anchoring conditions is satisfied, stores or supports another device to store a representative hash value or its processed value in the second blockchain database. Herein, the representative hash value is calculated by using both (i) a specific hash value which is a hash value of the authentication result transaction and (ii) its corresponding at least one neighboring hash value which is one of hash values including (ii-1) a hash value of an associated server certificate registering transaction corresponding to information on an associated server certificate or its processed value, (ii-2) a hash value of an associated application certificate registering transaction corresponding to information on an associated application certificate or its processed value, and (ii-3) a hash value of an associated authentication result transaction corresponding to an associated authentication result message or its processed value, and a transaction ID representing location information of the representative hash value or its processed value in the second blockchain database is acquired.

Herein, said one of the anchoring conditions may be one of (i) a condition that a certain number of the associated hash value and the neighboring hash value are acquired or generated, (ii) a condition that a certain amount of time is elapsed, (iii) a condition that a block is created in the first blockchain database, and (iv) a condition that has at least one of characteristics of the services.

The calculation by using both the specific hash value and its corresponding at least one neighboring hash value may be performed by various functions. Supposing that the specific hash value is an input, and that the neighboring hash values are x1, x2, . . . , xn, then a representative hash value t may be expressed as a following formula.

$$t=\text{hash}(\text{function}(\text{input}, x1, x2, \ldots, xn)) \qquad \text{<Formula 1>}$$

Herein, the authentication server may record and manage the specific hash value and its corresponding at least one neighboring hash value in a certain data structure. Herein, the data structure may vary and one example may be a Merkle tree. In this case, the calculation using both (i) the specific hash value and (ii) at least one hash value of at least one neighboring node which corresponds to a node of the specific hash value may be performed by using the Merkle tree.

That is, the authentication server may perform (i) a process of creating at least one Merkle tree by allotting the specific hash value to its leaf node, and (ii) a process of recording, if one of the anchoring conditions is satisfied, the representative hash value or its processed value calculated by using (ii-1) the specific hash value of a specific leaf node and (ii-2) at least one hash value allocated to at least one of other leaf nodes corresponding to the specific leaf node, in the second blockchain database.

The authentication server may record or support another device to record the hash value allocated to the root node as the representative hash value in the second blockchain database. Herein, a processed value of the representative hash value may be recorded. For example, a resultant value from hex operation on the representative hash value may be recorded.

Meanwhile, a first data structure and a second data structure may be connected in a form of a chain if the authentication server stores the specific hash value and its at least one neighboring hash value in the first data structure and then stores and manages the second data structure identical in a form to the first data structure.

Especially, as the example aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created.

Further, if the Merkle tree is a first tree among two or more Merkle trees linked in chains, a hash value or its processed value of a message data, which includes text, numbers or symbols, may be allocated to a first leaf node of the Merkle tree. For example, at the time of creation of the Merkle tree, a hash value of an input message initially given by the authentication server may be allocated.

Figure 4:
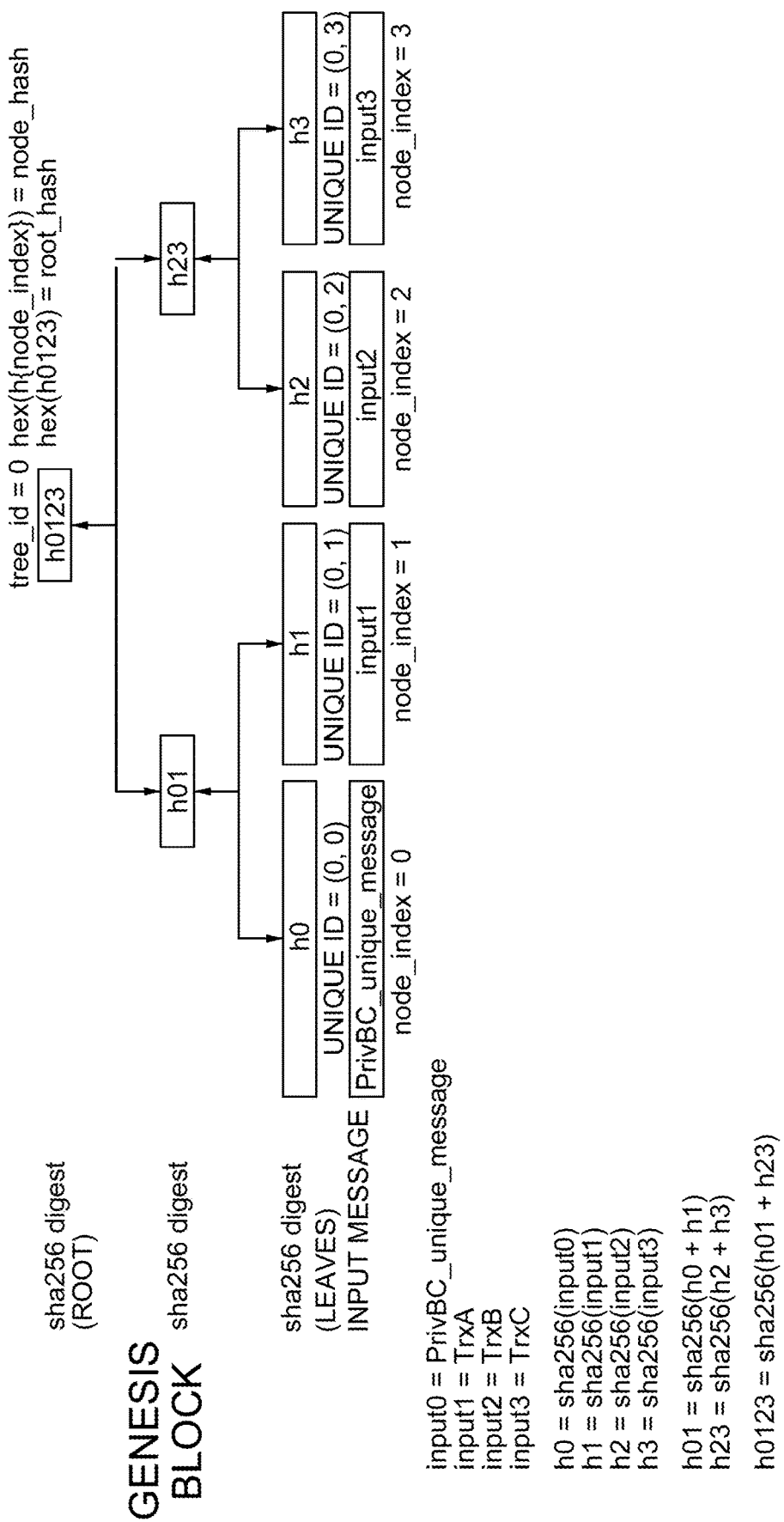
FIGS. 4 and 5 are drawings schematically illustrating a process of recording a transaction in a database in accordance with the second example embodiment of the present disclosure.
Figure 5:
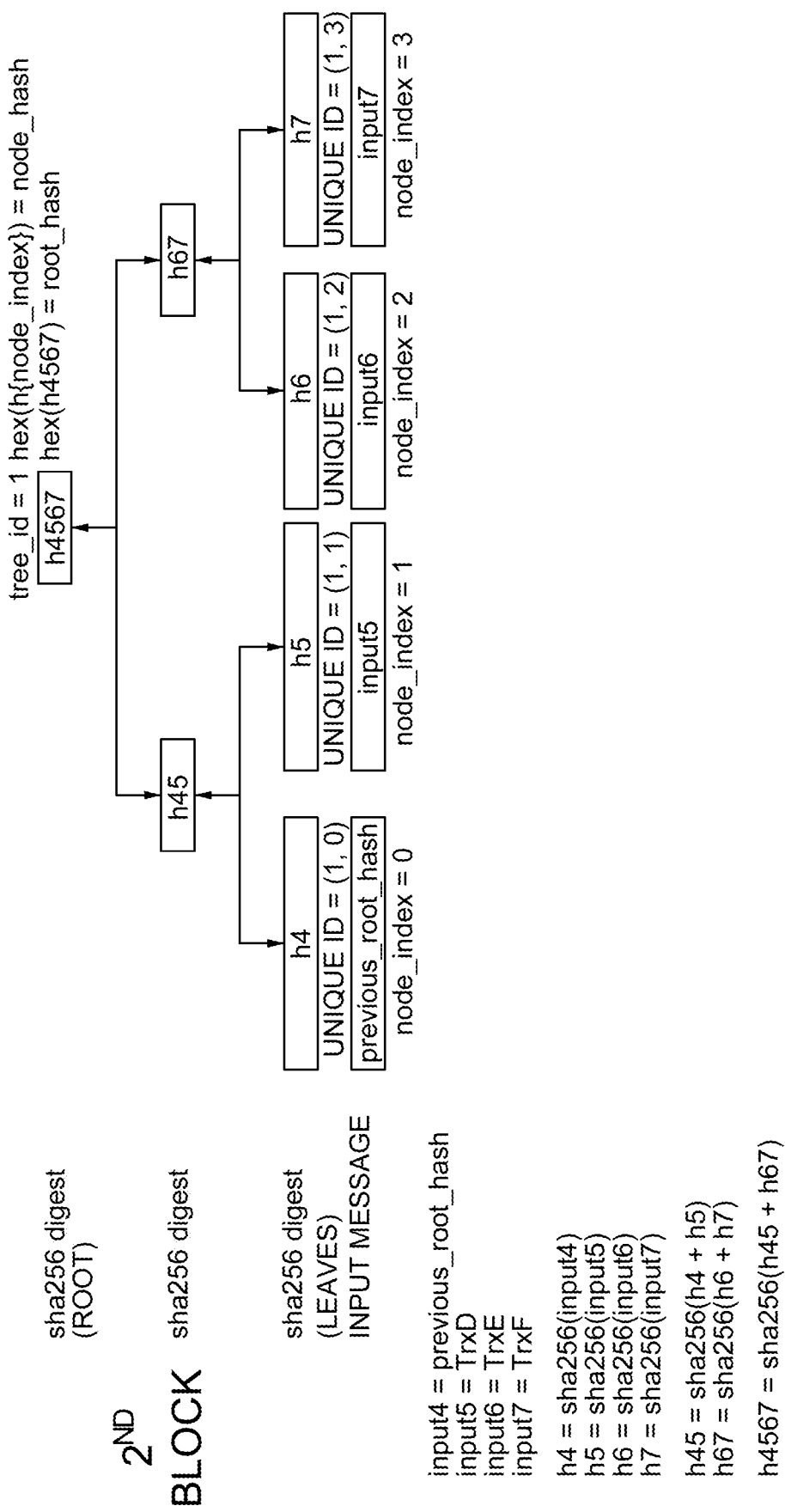

FIGS. 4 and 5 are drawings illustrating an example of a Merkle tree created in accordance with the present disclosure.

FIG. 4 illustrates a Merkle tree with four ($2^2$) leaf nodes. As the illustrated Merkle tree is a first Merkle tree whose tree id is zero, a hash value SHA256(PrivBC_unique_message) of PrivBC_unique_message is allocated to an h0 node which is a first leaf node. If transactions are being recorded, the authentication server may create a leaf node next to a last leaf node of the Merkle tree currently being generated, and may allocate or support another device to allocate the specific hash value or its processed value to said next leaf node. For example, if an allocation of values is completed with the h1 node as a last which is a second leaf node of the Merkle tree in FIG. 4, and if a new leaf node is to be created, then an h2 node which is a next leaf node may be created and the specific hash value or its processed value (sha256 (input2)) may be allocated to the h2 node. Further, the authentication server may calculate or support another device to calculate by using (i) a specific hash value and (ii) a hash value allocated to an h3 node which is a sibling node of the h2 node which is a third leaf node to which the specific hash value is allocated. The hash value of the calculated value above may be allocated to an h23 node which is a parent node of the h2 node and the h3 node. As the parent node, i.e., the h23 node, is not the root node of the Merkle tree, the authentication server may repeat the process by regarding the hash value allocated to the h23 node as the specific hash value. In other words, with the hash value allocated to the h23 node as a specific hash value, the hash values allocated to the h23 node and an h01 node may be used together to be calculated and allocated to an h0123 node which is a parent node of the h23 node and the h01 node. Herein, since the h0123 node is the root node, the authentication server may record or support another device to record the processed value hex(h{node_index}) of the hash value allocated to the h0123 node in the second blockchain database.

To explain this in a recursive way, if the at least one anchoring condition is satisfied, the authentication server may (x1) calculate or support another device to calculate an intermediate value by using both (i) the specific hash value and (ii) a hash value allocated to a sibling node of the specific leaf node, and then allocate or support another device to allocate a hash value of the intermediate value to a parent node of the specific leaf node, (x2) record or support another device to record the hash value of the intermediate value in the second blockchain database as the representative hash value if the parent node is a root node of the Merkle tree, and (x3) repeat steps from (x1) to (x3) by regarding the hash value of the intermediate value as the specific hash value and regarding the parent node as the specific leaf node if the parent node is not the root node.

In the second example embodiment, if the hash values including (i) a hash value of a specific server certificate registering transaction corresponding to information on a specific server certificate or its processed value, (ii) a hash value of a specific application certificate registering transaction corresponding to information on a specific application certificate or its processed value, and (iii) a hash value of a specific authentication result transaction corresponding to a specific authentication result message or its processed value are acquired as many as the number of the leaf nodes, then each of the hash values may be each input value, i.e., each value allocated to each of the leaf nodes, to the aforementioned Merkle tree.

Also, the authentication server may create a root value of the Merkle tree aforementioned at stated intervals, by referring to the anchoring condition (ii) above. In this case, if a certain amount of time is elapsed, the authentication server may create the Merkle tree by referring to input values by the time, and may record or support another device to record the root value of the Merkle tree in the second blockchain database.

However, in this case, no value may be allocated to a sibling node of the node to which the specific hash value is allocated even though the certain amount of time is elapsed. In case no hash value is allocated to the sibling node even though one of the anchoring conditions is satisfied, the authentication server may allocate or support another device to allocate a certain hash value to the sibling node to thereby produce a root value of the Merkle tree by the method aforementioned. For example, the authentication server may copy the specific hash value and allocate or support other device to allocate the specific hash value to the sibling node.

The characteristics of the services may be at least part of information on cost paid by entities who use the login delegation service, information on a time-zone during which recording of the transaction is performed, information on a location where the recording of the transaction is performed and information on a type of a company which is a managing party of a server involved in the recording. However, the scope of the present disclosure is not limited thereto.

Meanwhile, if a creation of a new Merkle tree starts and if the at least one anchoring condition is satisfied with no transaction having been received, the authentication server may create or support another device to create the new Merkle tree by allotting certain message data to its first and second leaf nodes and may record or support another device to record the root value of the new Merkle tree or its processed value in the second blockchain database. In this case, the new Merkle tree with two leaf nodes may be created.

Meanwhile, a first data structure and a second data structure may be connected in a form of a chain if the authentication server, as aforementioned, stores the specific hash value and its at least one neighboring hash value in the first data structure and then stores and manages the second data structure identical in a form to the first data structure. Especially, if the first data structure and the second data structure are Merkle trees, a root value of the first data structure or a hash value of the root value may be allocated to a first leaf node of the second data structure.

FIG. 5 is a drawing illustrating an example of a Merkle tree created in a form of the second data structure in accordance with the present disclosure.

By referring to FIG. 5, it is clear that the root value hex(h0123) of the Merkle tree whose tree_id is zero in FIG. 4 is allocated to the first leaf node which is an h4 node of a new Merkle tree. In such a manner, the present disclosure has advantage of improving data integrity, as tracking becomes easier even in a case of data forgery, by connecting multiple data structures created when a transaction occurs.

Also, a method for registering the certificate in accordance with the second example embodiment of the present disclosure may further include steps (not illustrated) as follows: periodically or in response to the integrity verification request, the authentication server verifies whether a first representative hash value or its processed value is identical to its corresponding second representative hash value or its processed value stored in the second blockchain database, to thereby verify or support another device to verify an integrity of at least one transaction stored in the first blockchain database. Herein, the first representative hash value is calculated by using both (i) the at least one transaction which is one of transactions including (i-1) a specific server certificate-registering transaction corresponding to information on a specific server certificate or its processed value, (i-2) a specific application certificate-registering transaction corresponding to information on a specific application certificate or its processed value, and (i-3) a specific authentication result transaction corresponding to information on a specific authentication result message or its processed value, and (ii) its corresponding at least one neighboring hash value.

As one example, the first blockchain database and the second blockchain database may be blockchain databases. Herein, the first blockchain database may be the private blockchain database and the second blockchain database may be the public blockchain database.

However, it is not limited to these, and those skilled in the art will understand that the first blockchain database may be the private blockchain database or the public blockchain database, and that in the same manner, the second blockchain database may be any one of the private blockchain database and the public blockchain database.

Next, the delegation method for temporary ID login in accordance with the second example embodiment of the present disclosure is explained, but the technological characteristics identical to those of the aforementioned first example embodiment will be omitted, and only specific details will be disclosed.

By referring to FIG. 3, in the delegation method for temporary ID login in accordance with the second example embodiment of the present disclosure, the aforementioned steps S310 to S330 regarding the first example embodiment may be performed on condition that a representative hash value or its processed value has been stored in the blockchain database. Herein, the representative hash value is calculated by using both (i) a specific hash value which is a hash value of the application certificate registering transaction corresponding to information on the application certificate or its processed value which is a certificate of the 2-nd application executed on the user device and (ii) its corresponding at least one neighboring hash value which is at least one of hash values including (ii-1) a hash value of an associated application certificate registering transaction corresponding to information on an associated application certificate or its processed value, and (ii-2) a hash value of an associated authentication result transaction corresponding to an associated authentication result message or its processed value. Meanwhile, whether the application certificate is valid may be determined by the authentication server by referring to the blockchain database.

Also, similar to the delegation method for multi-signed login in accordance with the second example embodiment, the delegation method for temporary ID login in accordance with the second example embodiment may further include steps (not illustrated) as follows: the authentication server (A) stores or supports another device to store the authentication result message or its processed value in the first blockchain database as the authentication result transaction, and (B) if at least one of anchoring conditions is satisfied, stores or supports another device to store a representative hash value or its processed value in the second blockchain database. Herein, the representative hash value is calculated by using both (i) a specific hash value which is a hash value of the authentication result transaction and (ii) its corresponding at least one neighboring hash value which is one of hash values including (ii-1) a hash value of an associated certificate registering transaction corresponding to information on an associated application certificate or its processed value, and (ii-2) a hash value of an associated authentication result transaction corresponding to an associated authentication result message or its processed value, and acquires a transaction ID representing location information of the representative hash value or its processed value in the second blockchain database.

Unlike the delegation method for multi-signed login in accordance with the second example embodiment, in the delegation method for temporary ID login in accordance with the second example embodiment, the neighboring hash value may not include information relevant to the associated server certificate registering transaction corresponding to information on the associated server certificate or its processed value, because the server certificate may not be a necessity. Except the difference as such, the processes described in the delegation method for multi-signed login in accordance with the second example embodiment may also be applied to the delegation method for temporary ID login in accordance with the second example embodiment.

Third Example Embodiment

Next, the third example embodiment of the method for delegating the login in accordance with the present disclosure is described. Below, only technical characteristics of the third example embodiment different from those of the aforementioned first example embodiment will be described.

The method in accordance with the third example embodiment may be performed by using a smart contract. The smart contract may be a source code which is compiled into a byte code capable of an execution on the authentication server or multiple computing devices including another device connected with the authentication server, may be configured to perform at least one predetermined procedure if one or more validity conditions are satisfied at a time of the execution, and an integrity which is a result of the execution may be verified by a consensus, on the result, outputted from the multiple computing devices.

Information on the certificate based on the smart contract may include (i) a public key PubA generated by the encryption based on the PKI (public key infrastructure), and (ii) a byte code BC(SC(VcertA)) which is a result of compiling the smart contract SC(VcertA) corresponding to the validity conditions VcertA of the certificate, and may further include (iii) an identification information function value IdhashA which is a result of applying the particular operation to the identification information to be used for identifying the user entity of the certificate. Also, the information on the certificate based on the smart contract may further include at least part of (i) a crypto type as information for identifying at least one of a type of encryption based on the PKI and a type of the particular operation, (ii) a license key, and (iii) a license level.

The information on the certificate as such may be acquired as a result of the authentication server or another device generating the smart contract SC(VcertA) corresponding to the validity conditions, and generating the byte code BC(SC(VcertA)) resulting from compiling the smart contract. Herein, the authentication server may have acquired (i) the public key PubA corresponding to the user entity of the certificate, (ii) the identification information function value IdhashA which is a result of applying the particular operation to the identification information for identifying the user entity of the certificate, and (iii) the validity condition VcertA of the certificate.

In the third example embodiment, the server certificate which is a certificate of the service-providing server and the application certificate which is a certificate of the authentication application executed on the user device may be certificates based on the smart contract.

Specifically, by referring to FIG. 2 again, in the delegation method for multi-signed login in accordance with the third example embodiment of the present disclosure, the aforementioned steps S210 and S215 regarding the first example embodiment may be performed on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of arguments of the smart contract SC(VcertA) of the server certificate and the application certificate has been stored in a state database SDB. At a time of initial recordation of the application certificate and the server certificate including the smart contract, said S(SC(VcertA)) may be recorded as an initial state in the state database. Herein, the initial state may be a state first given to the certificates to determine whether the validity conditions are satisfied, for example, the initial state corresponding to the smart contract in FIG. 7 may be "counter=10".

Thereafter, at steps of S230 and S235, the authentication server may refer to the blockchain database and the state database when determining whether the server certificate and the application certificate are valid. Specifically, each validity of the server certificate and the application certificate may be verified by referring to (i) the server certificate registering transaction acquired by referring to the blockchain database, (ii) the application certificate registering transaction, (iii) each previous execution result of the smart contract of each of the server certificate and the application certificate, which is retrieved from the state database, and (iv) each new execution result thereof. When referring to the blockchain database, the authentication server may use one or more transaction ID which indicates each location where each of the server certificate registering transaction and the application certificate registering transaction is stored in the blockchain database, and which are acquired at a time of registering each of the server certificate registering transaction and the application certificate registering transaction. More detailed description of determining whether the certificate is valid will be explained later with the description related to the authentication server. Herein, the validity conditions VcertA of the certificate may include any condition that is based on information acquirable by the smart contract, and for example, may include at least part of (i) information on the user entity's characteristics, (ii) weather information at the time of using the certificate, (iii) date information at the time of using the certificate, (iv) information on at least one person allowed to use the certificate, and (v) information on a predetermined count of usage limit of the certificate. Herein, in case the user entity is a person, the user entity's characteristics may include the person's gender, height, and age, etc., which may be acquired from various sources on a computing device executing the smart contract. The user entity's characteristics may even be included in the smart contract. Further, all of information from said (i) to said (v) above may be acquired from various sources on the multiple computing devices executing the smart contract, for example, the weather information at the time of using the certificate may be acquired from an Internet web site.

The examples of the smart contract configured according to the VcertA are illustrated in FIGS. 6 and 7 which are drawings exemplarily illustrating the smart contract which is a source code with its usage count of the certificate limited to initNumber and ten respectively, in accordance with the present disclosure.

By referring to FIG. 6 or 7, the source code of the smart contract with the validity conditions limiting the usage count of the certificate to initNumber or ten is disclosed. The "useCounter" is an arbitrary title of the smart contract, "int counter;" is a command corresponding to a state of a counter of usage, and the state of the counter modified by a command of "counter-=1;" is returned by a command of "return counter;".

Such a smart contract is intended to be converted into a bytecode and executed by multiple computing devices, referred to as nodes, constructing a public blockchain database, and each of execution results may be verified by a consensus algorithm which determines an execution result having a most count as the final result. In short, an integrity of the execution result of a smart contract may be verified by a consensus on the execution results outputted from the nodes, as known to those skilled in the art. Clearly, the nodes may be a singular node as the case may be, and in this case, a single computing device may output a verification result pursuant to such a consensus.

For reference, an example of a byte code which is a compiled result of smart contract in FIG. 7 is shown as below:

60606040525b600a6000600050819055505b607e80601 d60003960000f360606040526000357c0100000000000000 00000000000000000000000000000 00000000000000900 48 063d732d9551460395760355655b6002565b604460048 050 50605a565b604051808281526020019150506040518090910 390f35b600060 01600060000828282505403925050810905 5 5060006000050549050607b565b905 6.

Now, processes of the authentication server determining whether the server certificate and the application certificate are valid at steps of S230 and S235 in the delegation method for multi-signed login in accordance with the third example embodiment of the present disclosure will be described in detail. The steps S230 and S235 of the delegation method for multi-signed login in accordance with the third example embodiment may include a step as follows: similar to the first example embodiment, the authentication server verifies the multi-signed signature value by using the public key of the server certificate and the public key of the application certificate. Thereafter, the steps of S230 and S235 may further include steps (not illustrated) as follows: if the multi-signed signature value is determined as valid, the authentication server (i) executes or supports another device to execute a byte code BC1 of a server certificate smart contract which is a smart contract included in the server certificate by using a state S1 of the server certificate smart contract as an argument of the BC1, to thereby acquire an execution result of the server certificate smart contract and determine whether the server certificate is valid by referring to the execution result of the server certificate smart contract, and (ii) executes or supports another device to execute a byte code BC2 of an application certificate smart contract which is a smart contract included in the application certificate by using a state S2 of the application certificate smart contract as an argument of the BC2, to thereby acquire an execution result of the application certificate smart contract and determine whether the application certificate is valid by referring to the execution result of the application certificate smart contract.

Herein, since the process (i) is for determining whether the server certificate is valid, and the process (ii) is for determining whether the application certificate is valid, the process (i) and the process (ii) correspond to each other, and therefore the description below explains the process (i) only.

At the process (i), the byte code BC1 of the server certificate smart contract may be executed with the state S1 of the server certificate smart contract as the argument, and whether the server certificate is valid may be determined by referring to the execution result of the server certificate smart contract, and to describe the process by taking examples of FIGS. 6 and 7, the argument where an integer counter is equal to the state S1 which is larger than 0 as a remaining usage count of the certificate right before execution is shown. If the remaining usage counter is 0, the certificate cannot be used anymore, and by executing the byte code BC1 using the remaining usage counter as its argument, the execution result representing non-authentication, for example, counter=−1, may be acquired, or alternatively, without executing the byte code BC1, a previous execution result representing non-authenticability may be retrieved from the state database. Also, there can be many other smart contracts capable of allowing determination of whether a certificate is valid by referring to an execution result based on arguments of various conditions.

After the usage of the certificate as aforementioned, the delegation method for multi-signed login in accordance with the third example embodiment of the present disclosure may further include steps (not illustrated) as follows: after the step of S250, the authentication server (i) stores or supports another device to store the authentication result message or its processed value in the blockchain database as the authentication result transaction, and (ii) updates or supports another device to update the state S(SC(VcertA)) in the state database to a new state S'(SC(VcertA)) in the state database by referring to the execution result acquired from the execution.

Also, the method for registering the certificate in accordance with the third example embodiment of the present disclosure may include a step where each integrity of the specific server certificate registering transaction, the specific application certificate registering transaction, and the specific authentication result transaction is verified as in the first example embodiment, and may further include a step (not illustrated) where the authentication server verifies or supports another device to verify the integrity of the execution result periodically or in response to the integrity verification request by referring to the execution result of individual smart contracts stored in the state database.

Next, the third example embodiment of the delegation method for temporary ID login in accordance with the third example embodiment of the present disclosure is described. By referring to FIG. 3, in the delegation method for temporary ID login in accordance with the third example embodiment of the present disclosure, the aforementioned steps S310 to S330 regarding the delegation method for temporary ID login of the first example embodiment may be performed on condition that an application certificate-registering transaction corresponding to information on the application certificate or its processed value has been stored in the blockchain database and that a state S(SC(VcertA)) which is a set of arguments of the smart contract SC(VcertA) of the application certificate has been stored in a state database SDB. Meanwhile, whether the application certificate is valid may be determined by the authentication server by referring to the blockchain database and the state database.

The process of determining whether the application certificate is valid is similar to that of the delegation method for multi-signed login in accordance with the third example embodiment in the process of determining based on the smart contract, and thus omitted.

Meanwhile, all of the example embodiments of the present disclosure may be performed independently from each other, but may also be performed in any combinations thereof, as can be understood by those skilled in the art. For example, the delegation method for multi-signed login in accordance with the second example embodiment may be implemented in a combination with the delegation method for multi-signed login in accordance with the third example embodiment. In this case, as an example, a particular tree may be generated by using both (i) a function value of an individual transaction stored in the blockchain database, i.e., the first blockchain database, of the third example embodiment and (ii) a function value of a value stored in the state database, and a representative function value of the particular tree may be stored in the second blockchain database. The integrity of information stored in the first blockchain database may be verified later by comparing (i) the function value generated by using information stored in the first blockchain database and (ii) the representative function value stored in the second blockchain database, via anchoring as such.

Throughout all of the example embodiments described in the specification so far, security and usability are improved when compared to the conventional OAuth, and forgery and falsification of the certificate are prevented by using the blockchain database.

Advantage of a technique described herein as the example embodiments is ensuring reliability of the certificate by effectively preventing forgery and falsification of authentication-related information such as a public key and a function value, and ensuring integrity of authentication-related transactions by verification thereof using the blockchain database.

The present disclosure has an effect of replacing the conventional OAuth in a more secure, more usable, and more inexpensive way.

The present disclosure has another effect of providing strong security by high level of encryption, multiple signing, issuance of a temporary ID through cross-checking, etc.

The present disclosure has still yet another effect of guaranteeing reliability by preventing forgery of information related to certificates.

Based on the explanation of the above embodiments, those skilled in the art can clearly understand that the present disclosure may be implemented by combination of software and hardware or hardware alone. The part contributing to the prior art or the object of a technical solution of the present disclosure may be implemented in a form of executable program command through a variety of computer components and may be recorded in computer readable media. The computer readable media may include solely or in combination, program commands, data files, and data structures. The program commands recorded to the media may be components specially designed for the present disclosure or may be known and usable to a skilled human in a general field. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, comprising steps of:

(a) on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the service-providing server, if authentication-requesting information which is information for requesting a delegation of the login via the authentication application is acquired from a service-providing application executed on the user device, transmitting or supporting another device to transmit authentication-responding information, which is a result of determining whether the delegation of the login is possible, to the service-providing application;

(b) the service-providing server, after an authentication redirection request is transmitted from the service-providing application to the authentication application, if server challenge-requesting information including a variable authentication value, which is generated by the authentication server, is acquired from the authentication application, transmitting or supporting another device to transmit server challenge-responding information corresponding to the server challenge-requesting information to the authentication application, to thereby allow the authentication server to determine whether the server certificate and the application certificate are valid by referring to the blockchain database and the state database; and (c) the service-providing server, if an authentication result message, including information on whether the server certificate and the application certificate are valid, is acquired from the authentication server, and if the authentication result message is an authentication success message representing that the server certificate and the application certificate are valid, transmitting or supporting another device to transmit an access token to the service-providing application, to thereby allow the service-providing application to use the service via the access token.

2. The method of claim 1, wherein, at the step of (b), the server challenge-requesting information includes an encoded variable authentication value generated by encoding the variable authentication value with a public key of the server certificate, and wherein the service-providing server acquires the variable authentication value from the server challenge-requesting information by using a private key of the server certificate, and transmits the server challenge-responding information including a signature value, generated by signing the variable authentication value with the private key of the server certificate, to the authentication application.

3. The method of claim 1, wherein the validity conditions VcertA of the certificate are based on at least part of (i) information on the user entity's characteristics, (ii) weather information at a time of using the certificate, (iii) date information at the time of using the certificate, (iv) information on at least one person allowed to use the certificate, and (v) information on a predetermined count of usage of the certificate.

4. The method of claim 1, wherein the blockchain database is a private blockchain database or a public blockchain database.

5. A method for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, comprising steps of:

(a) on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the authentication server, if challenge-start requesting information is acquired from the authentication application executed on the user device in response to an authentication redirection request corresponding to authentication-requesting information which is information for requesting a delegation of the login via the authentication application executed on the user device, generating a variable authentication value corresponding to the challenge-start requesting information, and transmitting or supporting another device to transmit challenge-start responding information including the variable authentication value to the authentication application, to thereby allow the authentication application to acquire server challenge-responding information, corresponding to server challenge-requesting information for determining whether the server certificate is valid, from the service-providing server;

(b) the authentication server, if response-requesting information including a multi-signed signature value is acquired from the authentication application wherein the multi-signed signature value is generated by signing the server challenge-responding information with a private key of the application certificate, determining or supporting another device to determine whether the server certificate and the application certificate are valid by referring to the response-requesting information, the blockchain database, and the state database; and (c) the authentication server (i) transmitting or supporting another device to transmit an authentication result message including information on whether the server certificate is valid to at least one of the authentication application and the service-providing server, (ii) if the authentication result message is an authentication success message representing that the server certificate is valid, allowing the service-providing server to transmit an access token to a service-providing application executed on the user device, and (iii) allowing the service-providing application to use the service via the access token.

6. The method of claim 5, wherein the authentication server manages or supports another device to manage information on an access level to the service-providing server, and determines an authorization level by referring to the access level, and wherein the authentication result message includes information on the authorization level, and wherein whether the server certificate is valid is determined by referring to the authorization level.

7. The method of claim 5, wherein the step of (b) includes steps of:

(b1) the authentication server determining whether the multi-signed signature value is valid by using a public key of the server certificate and a public key of the application certificate; and (b2) if the multi-signed signature value is determined as valid, the authentication server (i) executing or supporting another device to execute a bytecode BC1 of a server certificate smart contract, which is a smart contract included in the server certificate, by using a state S1 of the server certificate smart contract as a set of one or more arguments of the BC1, to thereby acquire an execution result of the server certificate smart contract and determine whether the server certificate is valid by referring to the execution result of the server certificate smart contract, and (ii) executing or supporting another device to execute a bytecode BC2 of an application certificate smart contract which is a smart contract included in the application certificate by using a state S2 of the application certificate smart contract as a set of one or more arguments of the BC2, to thereby acquire an execution result of the application certificate smart contract, determine whether the application certificate is valid by referring to the execution result of the application certificate smart contract, and determine whether the server certificate and the application certificate are valid.

8. The method of claim 7, after the step of (b), further comprising a step of:

(c0) the authentication server (i) storing or supporting another device to store the authentication result message or its processed value in the blockchain database as an authentication result transaction, and (ii) registering or supporting another device to register the execution result of the server certificate smart contract and the execution result of the application certificate smart contract in the state database as each new state S'(SC(VcertA)).

9. The method of claim 5, further comprising a step of:
(e) the authentication server, by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, verifying or supporting another device to verify each integrity of said (i), said (ii) and said (iii) periodically or in response to an integrity verification request.

10. The method of claim 5, further comprising a step of:
(f) the authentication server verifying or supporting another device to verify the integrity of the execution result periodically or in response to an integrity verification request by referring to the execution result of individual smart contracts stored in the state database.

11. A service-providing server for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, comprising:

a communication part, on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the service-providing server, for acquiring authentication-requesting information which is information for requesting a delegation of the login via the authentication application from a service-providing application executed on the user device; and a processor for performing processes of (I) transmitting or supporting another device to transmit authentication-responding information, which is a result of determining whether the delegation of the login is possible, to the service-providing application if the authentication-requesting information is acquired, (II) after an authentication redirection request is transmitted from the service-providing application to the authentication application, if server challenge-requesting information including a variable authentication value, which is generated by the authentication server, is acquired from the authentication application, transmitting or supporting another device to transmit server challenge-responding information corresponding to the server challenge-requesting information to the authentication application, to thereby allow the authentication server to determine whether the server certificate and the application certificate are valid by referring to the blockchain database and the state database and (III) if an authentication result message, including information on whether the server certificate and the application certificate are valid, is acquired from the authentication server, and if the authentication result message is an authentication success message representing that the server certificate and the application certificate are valid, transmitting or supporting another device to transmit an access token to the service-providing application, to thereby allow the service-providing application to use the service via the access token.

12. The service-providing server of claim 11, wherein, at the process of (II), the server challenge-requesting information includes an encoded variable authentication value generated by encoding the variable authentication value with a public key of the server certificate, and wherein the processor acquires the variable authentication value from the server challenge-requesting information by using a private key of the server certificate, and transmits the server challenge-responding information including a signature value, generated by signing the variable authentication value with the private key of the server certificate, to the authentication application.

13. The service-providing server of claim 11, wherein the validity conditions VcertA of the certificate are based on at least part of (i) information on the user entity's characteristics, (ii) weather information at a time of using the certificate, (iii) date information at the time of using the certificate, (iv) information on at least one person allowed to use the certificate, and (v) information on a predetermined count of usage of the certificate.

14. An authentication server for delegating a login via authentication based on a PKI (public key infrastructure) by utilizing a blockchain database and a smart contract in response to a login request from a user for using a service which is provided by a service-providing server, wherein the smart contract is source code which is compiled into bytecodes capable of an execution on an authentication server or multiple computing devices connected with the authentication server, and the smart contract is configured to perform at least one predetermined procedure if one or more validity conditions are satisfied at a time of the execution, wherein an integrity of a result of the execution is verified by a consensus among the multiple computing devices, wherein information on a certificate based on the smart contract includes (i) a public key PubA generated by encryption based on the PKI, (ii) an identification information function value IdhashA created by applying a particular operation to identification information to be used for identifying a user entity of the certificate, and (iii) a bytecode BC(SC(VcertA)) which is a result of compiling the smart contract SC(VcertA) corresponding to the validity conditions VcertA of the certificate, and wherein a server certificate which is a certificate of the service-providing server and an application certificate which is a certificate of an authentication application executed on a user device are certificates based on the smart contract, comprising:

a communication part, on condition that a server certificate-registering transaction corresponding to information on the server certificate or its processed value, or an application certificate-registering transaction corresponding to information on the application certificate or its processed value has been stored in the blockchain database and on condition that a state S(SC(VcertA)) which is a set of one or more arguments of the smart contract SC(VcertA) of the server certificate and the application certificate has been stored in a state database SDB, the authentication server, for acquiring challenge-start requesting information from the authentication application executed on the user device in response to an authentication redirection request corresponding to authentication-requesting information which is information for requesting a delegation of the login via the authentication application executed on the user device; and a processor for performing processes of (I) generating a variable authentication value corresponding to the challenge-start requesting information if the challenge-start requesting information is acquired, and transmitting or supporting another device to transmit challenge-start responding information including the variable authentication value to the authentication application, to thereby allow the authentication application to acquire server challenge-responding information, corresponding to server challenge-requesting information for determining whether the server certificate is valid, from the service-providing server, (II) if response-requesting information including a multi-signed signature value is acquired from the authentication application wherein the multi-signed signature value is generated by signing the server challenge-responding information with a private key of the application certificate, determining or supporting another device to determine whether the server certificate and the application certificate are valid by referring to the response-requesting information, the blockchain database, and the state database, and (III) (i) transmitting or supporting another device to transmit an authentication result message including information on whether the server certificate is valid to at least one of the authentication application and the service-providing server, (ii) if the authentication result message is an authentication success message representing that the server certificate is valid, allowing the service-providing server to transmit an access token to a service-providing application executed on the user device, and (iii) allowing the service-providing application to use the service via the access token.

15. The authentication server of claim 14, wherein the processor manages or supports another device to manage information on an access level to the service-providing server, and determines an authorization level by referring to the access level, and wherein the authentication result message includes information on the authorization level, and wherein whether the server certificate is valid is determined by referring to the authorization level.

16. The authentication server of claim 14, wherein the process of (II) includes processes of:
(II-1) determining whether the multi-signed signature value is valid by using a public key of the server certificate and a public key of the application certificate; and
(II-2) if the multi-signed signature value is determined as valid, (i) executing or supporting another device to execute a bytecode BC1 of a server certificate smart contract, which is a smart contract included in the server certificate, by using a state S1 of the server certificate smart contract as a set of one or more arguments of the BC1, to thereby acquire an execution result of the server certificate smart contract and determine whether the server certificate is valid by referring to the execution result of the server certificate smart contract, and (ii) executing or supporting another device to execute a bytecode BC2 of an application certificate smart contract which is a smart contract included in the application certificate by using a state S2 of the application certificate smart contract as a set of one or more arguments of the BC2, to thereby acquire an execution result of the application certificate smart contract, determine whether the application certificate is valid by referring to the execution result of the application certificate smart contract, and determine whether the server certificate and the application certificate are valid.

17. The authentication server of claim 16, wherein, after the process of (II), the processor further performs processes of:
(III0-a) storing or supporting another device to store the authentication result message or its processed value in the blockchain database as an authentication result transaction, and (III0-b) registering or supporting another device to register the execution result of the server certificate smart contract and the execution result of the application certificate smart contract in the state database as each new state S'(SC(VcertA)).

18. The authentication server of claim 14, wherein the processor further performs a process of:
(V) by referring to at least one of (i) a specific server certificate-registering transaction corresponding to information on a specific server certificate or its processed value, (ii) a specific application certificate-registering transaction corresponding to information on a specific application certificate or its processed value, and (iii) a specific authentication result transaction corresponding to information on a specific authentication result message or its processed value, which are stored in the blockchain database, verifying or supporting another device to verify each integrity of said (i), said (ii) and said (iii) periodically or in response to an integrity verification request.

19. The authentication server of claim 14, wherein the processor further performs a process of:
(VI) verifying or supporting another device to verify the integrity of the execution result periodically or in response to an integrity verification request by referring to the execution result of individual smart contracts stored in the state database.

* * * * *